US009865855B2

(12) United States Patent
Miyazaki et al.

(10) Patent No.: US 9,865,855 B2
(45) Date of Patent: Jan. 9, 2018

(54) ENERGY STORAGE DEVICE

(71) Applicant: GS Yuasa International Ltd., Kyoto-shi, Kyoto (JP)

(72) Inventors: Akihiko Miyazaki, Kyoto (JP); Kenta Nakai, Kyoto (JP); Tomonori Kako, Kyoto (JP); Sumio Mori, Kyoto (JP)

(73) Assignee: GS Yuasa International Ltd., Kyoto (JP)

(*) Notice: Subject to any disclaimer, the term of this patent is extended or adjusted under 35 U.S.C. 154(b) by 0 days.

(21) Appl. No.: 15/052,330

(22) Filed: Feb. 24, 2016

(65) Prior Publication Data

US 2016/0248065 A1  Aug. 25, 2016

(30) Foreign Application Priority Data

Feb. 25, 2015  (JP) ................. 2015-035172

(51) Int. Cl.
| | | |
|---|---|---|
| H01M 2/16 | (2006.01) |
| H01M 4/36 | (2006.01) |
| H01M 4/583 | (2010.01) |
| H01M 4/62 | (2006.01) |

(Continued)

(52) U.S. Cl.
CPC .......... *H01M 2/1673* (2013.01); *H01G 11/26* (2013.01); *H01G 11/42* (2013.01);
(Continued)

(58) Field of Classification Search
CPC ........ H01G 11/26; H01G 11/42; H01G 11/52; H01M 2/166; H01M 2/1686; H01M 4/133;
(Continued)

(56) References Cited

U.S. PATENT DOCUMENTS

| | | |
|---|---|---|
| 2004/0033421 A1 | 2/2004 | Shibuya |
| 2006/0188785 A1 | 8/2006 | Inoue |

(Continued)

FOREIGN PATENT DOCUMENTS

| | | |
|---|---|---|
| EP | 2654107 | 10/2013 |
| JP | 10241656 A2 | 9/1998 |

(Continued)

OTHER PUBLICATIONS

Extended European Search Report dated Jun. 13, 2016 issued in the corresponding European patent application No. 16157176.5.

*Primary Examiner* — Sarah A Slifka
(74) *Attorney, Agent, or Firm* — Rankin, Hill & Clark LLP

(57) ABSTRACT

An energy storage device includes a positive electrode, a negative electrode, and an insulating layer arranged between these electrodes to electrically insulate these electrodes. The negative electrode includes a composite layer containing active material particles. The composite layer of the negative electrode, and the positive electrode are arranged to face each other across the insulating layer. The insulating layer contains electrically insulating particles, and is made porous by a gap between these particles. The composite layer of the negative electrode is made porous by a gap between the active material particles, and "$-0.8 \leq \text{Log } B - \text{Log } A \leq 1.0$" is satisfied in which in a pore distribution of the composite layer, a pore peak diameter is represented by A (μm), and in a pore distribution of the insulating layer, a peak diameter is represented by B (μm).

14 Claims, 8 Drawing Sheets

(51) Int. Cl.
  *H01G 11/42* (2013.01)
  *H01G 11/52* (2013.01)
  *H01G 11/26* (2013.01)
  *H01M 4/133* (2010.01)
  *H01M 4/587* (2010.01)
  *H01M 10/0525* (2010.01)
  *H01M 4/02* (2006.01)

(52) U.S. Cl.
  CPC ............ *H01G 11/52* (2013.01); *H01M 2/166* (2013.01); *H01M 2/1686* (2013.01); *H01M 4/133* (2013.01); *H01M 4/364* (2013.01); *H01M 4/583* (2013.01); *H01M 4/587* (2013.01); *H01M 4/62* (2013.01); *H01M 4/622* (2013.01); *H01M 10/0525* (2013.01); *H01M 4/366* (2013.01); *H01M 2004/021* (2013.01)

(58) Field of Classification Search
  CPC ...... H01M 4/364; H01M 4/583; H01M 4/587; H01M 4/62; H01M 4/622; H01M 10/0525
  See application file for complete search history.

(56) References Cited

U.S. PATENT DOCUMENTS

| | | |
|---|---|---|
| 2006/0199294 A1 | 9/2006 | Nishino |
| 2007/0202404 A1 | 8/2007 | Suzuki |
| 2008/0166637 A1 | 7/2008 | Inagaki |
| 2009/0253033 A1 | 10/2009 | Hirose |
| 2009/0325074 A1 | 12/2009 | Hayashi |
| 2011/0159370 A1 | 6/2011 | Sakurai |
| 2012/0251878 A1 | 10/2012 | Ueki |
| 2014/0154557 A1 | 6/2014 | Kako |
| 2014/0295263 A1 | 10/2014 | Abe |

FOREIGN PATENT DOCUMENTS

| | | |
|---|---|---|
| JP | 3765396 B2 | 4/2006 |
| JP | 2008186803 A2 | 8/2008 |
| JP | 2009252580 A2 | 10/2009 |
| JP | 4476254 B2 | 6/2010 |
| JP | 2010192365 A2 | 9/2010 |
| JP | 2010244818 A2 | 10/2010 |
| JP | 4667242 B1 | 4/2011 |
| JP | 4763253 B2 | 8/2011 |
| JP | 4847861 B1 | 12/2011 |
| JP | 2011249207 A2 | 12/2011 |
| JP | 2012064544 A2 | 3/2012 |
| JP | 5055865 | 10/2012 |
| JP | 5112853 | 1/2013 |
| JP | 5164413 | 3/2013 |
| JP | 2014063753 A2 | 4/2014 |
| JP | 2014089887 A2 | 5/2014 |
| JP | 2014132563 A2 | 7/2014 |
| JP | 2014191912 A2 | 10/2014 |
| WO | 2010050507 A1 | 5/2010 |
| WO | 2011036797 A1 | 3/2011 |
| WO | 2013073011 A1 | 5/2013 |

_US 9,865,855 B2_

ENERGY STORAGE DEVICE

CROSS-REFERENCE TO RELATED APPLICATIONS

This application claims the benefit of Japanese patent application No. 2015-035172 filed on Feb. 25, 2015, which is incorporated by reference.

FIELD

The present invention relates to an energy storage device.

BACKGROUND

Conventionally, an energy storage device is known which is equipped with a positive electrode and a negative electrode to have a structure in which the positive electrode includes a positive active material layer, the negative electrode includes a negative active material layer, and the positive active material layer and the negative active material layer are arranged to face each other.

As such an energy storage device, a nonaqueous electrolyte secondary battery is proposed which is further equipped with a porous layer for electrically insulating positive and negative electrodes from each other, the porous layer being arranged between the positive active material layer and the negative active material layer (WO 2010/050507).

In the energy storage device disclosed in WO 2010/050507, the positive and negative electrodes are electrically insulated from each other by the porous layer.

However, the nonaqueous electrolyte secondary battery disclosed in WO 2010/050507 merely includes the positive and negative electrodes, and the porous layer. Thus, immediately after charge-discharge cycles (for example, within 2 hours of the end of the cycles), the battery may be temporarily decreased in power (hereinafter, the power-decrease may be referred to temporary deterioration).

SUMMARY

The following presents a simplified summary of the invention disclosed herein in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

An object of the present invention is to provide an energy storage device in which temporary deterioration is suppressed.

An energy storage device according to an aspect of the present invention includes a positive electrode, a negative electrode, and an insulating layer arranged between the positive and negative electrodes to electrically insulate the positive and negative electrodes, the negative electrode includes a composite layer containing active material particles, the composite layer of the negative electrode, and the positive electrode are arranged to face each other across the insulating layer, the insulating layer contains electrically insulating particles, and is made porous by a gap between the electrically insulating particles, the composite layer of the negative electrode is made porous by a gap between the active material particles, and a following relational expression (1) is satisfied:

$$-0.8 \leq \text{Log } B - \text{Log } A \leq 1.0$$

in which in a distribution of pores in the composite layer, a pore peak diameter is represented by $A$ (μm), and in a distribution of pores in the insulating layer, a pore peak diameter is represented by $B$ (μm).

BRIEF DESCRIPTION OF DRAWINGS

The foregoing and other features of the present invention will become apparent from the following description and drawings of an illustrative embodiment of the invention in which.

DESCRIPTION OF EMBODIMENTS

Figure 1:
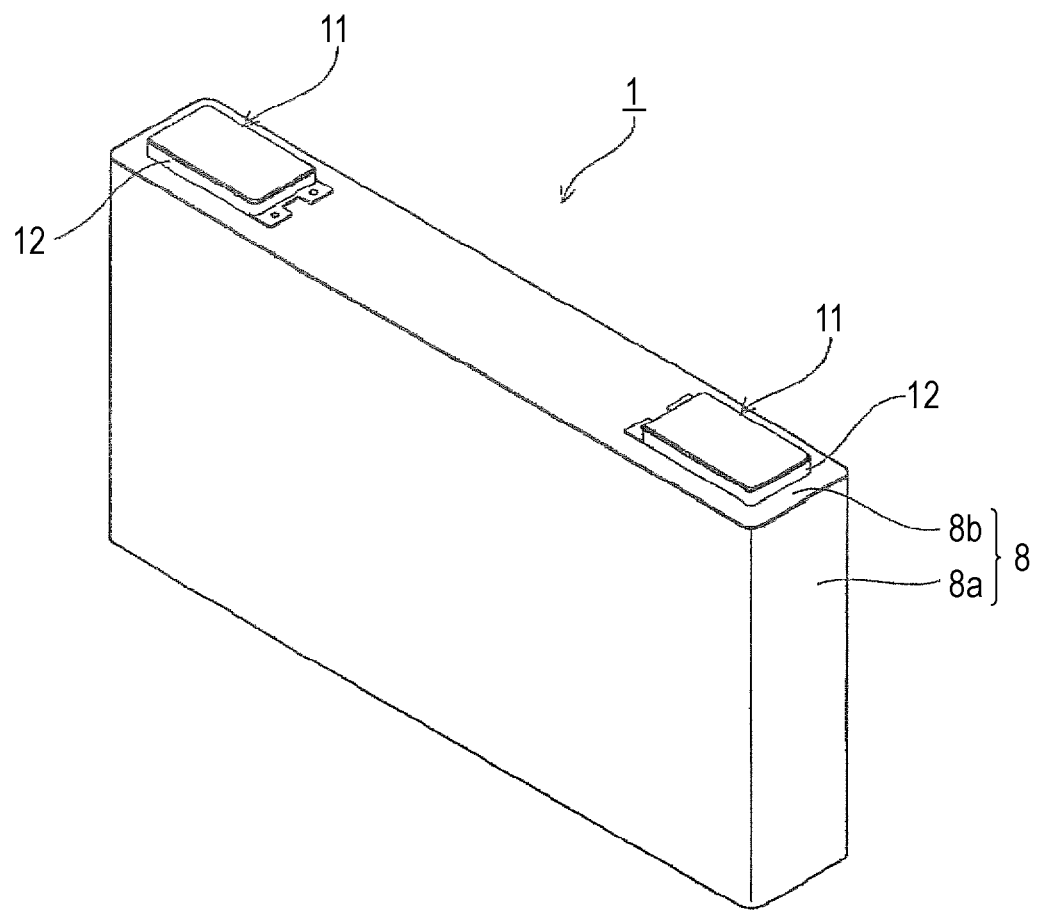
FIG. 1 is a schematic view illustrating an external appearance of a nonaqueous electrolyte secondary battery which is an example of an energy storage device.

An energy storage device according to an aspect of the present invention includes a positive electrode, a negative electrode, and an insulating layer arranged between the positive and negative electrodes to electrically insulate the positive and negative electrodes from each other. The negative electrode includes a composite layer containing active material particles. The composite layer of the negative electrode, and the positive electrode are arranged to face each other across the insulating layer. The insulating layer contains electrically insulating particles, and is made porous by a gap between the electrically insulating particles. The composite layer of the negative electrode is made porous by a gap between the active material particles. A following relational expression (1) is satisfied:

$$-0.8 \leq \text{Log } B - \text{Log } A \leq 1.0$$

in which in a distribution of pores in the composite layer, a pore peak diameter is represented by $A$ (μm), and in a distribution of pores in the insulating layer, a pore peak diameter is represented by $B$ (μm).

According to the energy storage device having the above-mentioned configuration, the pore peak diameter $A$ (μm) in the pore distribution of the composite layer of the negative electrode and the pore peak diameter $B$ (μm) in the pore distribution of the insulating layer satisfy the relational expression (1). Thus, from the surface of the active material in the composite layer of the negative electrode to the insulating layer, paths for electrons are appropriately and sufficiently ensured. As a result, even immediately after charge-discharge cycles, reaction in the electrode plane direction does not turn into an ununiformed state. Accordingly, a temporary power-decrease (temporary deterioration) can be suppressed, which may be caused immediately after charge-discharge cycles.

In the energy storage device, the average primary particle diameter D90 of the active material particles in the composite layer may be 3 μm or more and 18 μm or less.

In the energy storage device, a following relational expression (2) may be satisfied: $-3 \leq C-D \leq 6$ in which an average primary particle diameter D90 of the active material particles in the composite layer is represented by C (μm), and an average primary particle diameter D90 of the electrically insulating particles in the insulating layer is represented by D (μm).

In the energy storage device, the active material particles in the negative electrode may include non-graphitizable carbon.

In the energy storage device, the composite layer of the negative electrode may further include carboxymethylcellulose.

With this configuration, temporary deterioration can be suppressed.

Hereinafter, with reference to the drawings, an embodiment of the energy storage device of the present invention will be described. The energy storage device may be primary battery, secondary battery, capacitor, and other. As an example of the energy storage device, a chargeable and dischargeable secondary battery will be explained. The name of each constituent member (each constituting element) of the present embodiment is a name exclusively for the embodiment. Thus, the name may be different from the name of each of the constituent members (each of the constituting elements) in the item "BACKGROUND".

An energy storage device 1 according to the present embodiment includes a positive electrode 3, a negative electrode 5, and a sheet type insulating layer 7 arranged between the positive electrode 3 and the negative electrode 5 to electrically insulate the positive electrode 3 and the negative electrode 5 from each other. The negative electrode 5 includes a composite layer 5b containing active material particles. The composite layer 5b of the negative electrode and the positive electrode 3 are arranged to face each other across the insulating layer 7. The insulating layer 7 contains electrically insulating particles, and is made porous by a gap between the electrically insulating particles. The composite layer 5b of the negative electrode 5 is made porous by a gap between the active material particles. The energy storage device 1 satisfies the following relational expression (1):

$$-0.8 \leq \text{Log } B - \text{Log } A \leq 1.0$$

in which in the distribution of pores in the composite layer, the pore peak diameter is represented by A (μm), and in the distribution of pores in the insulating layer, the pore peak diameter is represented by B (μm).

The energy storage device 1 according to the present embodiment is a nonaqueous electrolyte secondary battery. More specifically, the energy storage device 1 is a lithium ion secondary battery 1, which makes use of electron transfer generated to the accompaniment of the transfer of lithium ions. This energy storage device 1 is used singly, or energy storage devices equivalent the energy storage device 1 are together used. Specifically, the energy storage device 1 is used singly when a power and a voltage required are small. In the meantime, when at least one of required power and voltage is large, the energy storage device 1 is used in an energy storage apparatus in the state of being combined with the other energy storage device(s). In this energy storage apparatus, the energy storage device 1 and the energy storage device(s) supply an electrical energy.

Figure 4:
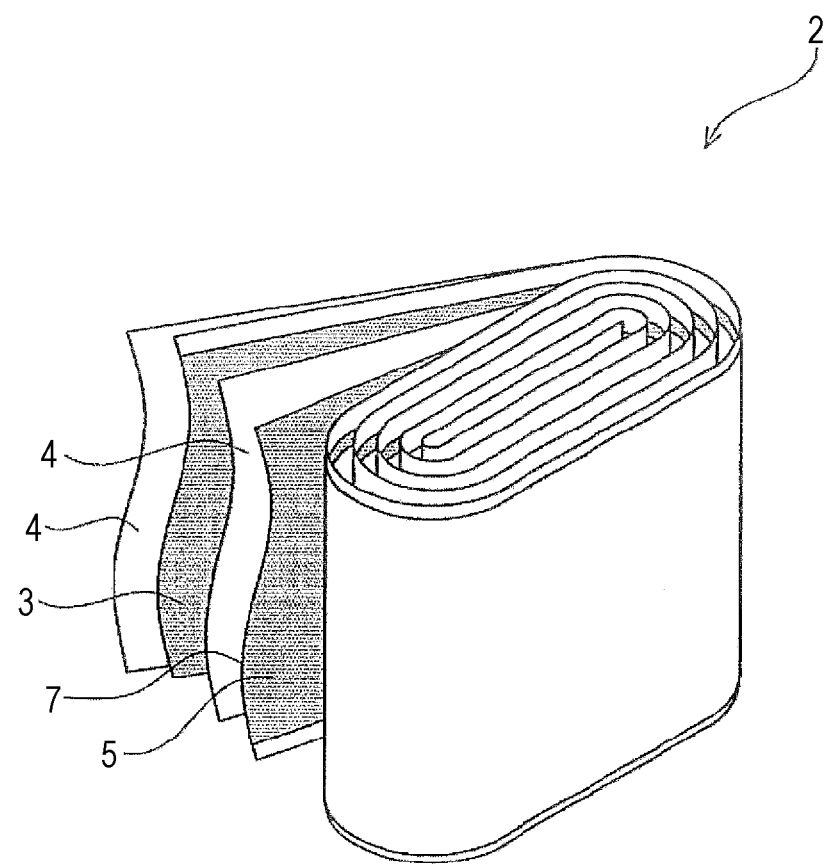
FIG. 4 is a schematic view of an external appearance of an electrode assembly.

As illustrated in, for example, FIG. 4, the nonaqueous electrolyte secondary battery 1 has the positive electrode 3 of a sheet type, the negative electrode 5 of a sheet type, and a separator 4 of a sheet type. As illustrated in, for example, FIG. 4, the nonaqueous electrolyte secondary battery 1 has an electrode assembly 2 obtained by winding up the positive electrode 3, the negative electrode 5, and the separator 4 and an insulating layer 7 that are arranged between the positive electrode 3 and the negative electrode 5. As illustrated in, for example, FIG. 5, in the electrode assembly 2, the positive electrode 3 and the negative electrode 5 are layered to interpose the separator 4 and the insulating layer 7 therebetween. A composite layer 5b of the negative electrode 5 and the positive electrode 3 face each other.

Figure 7:
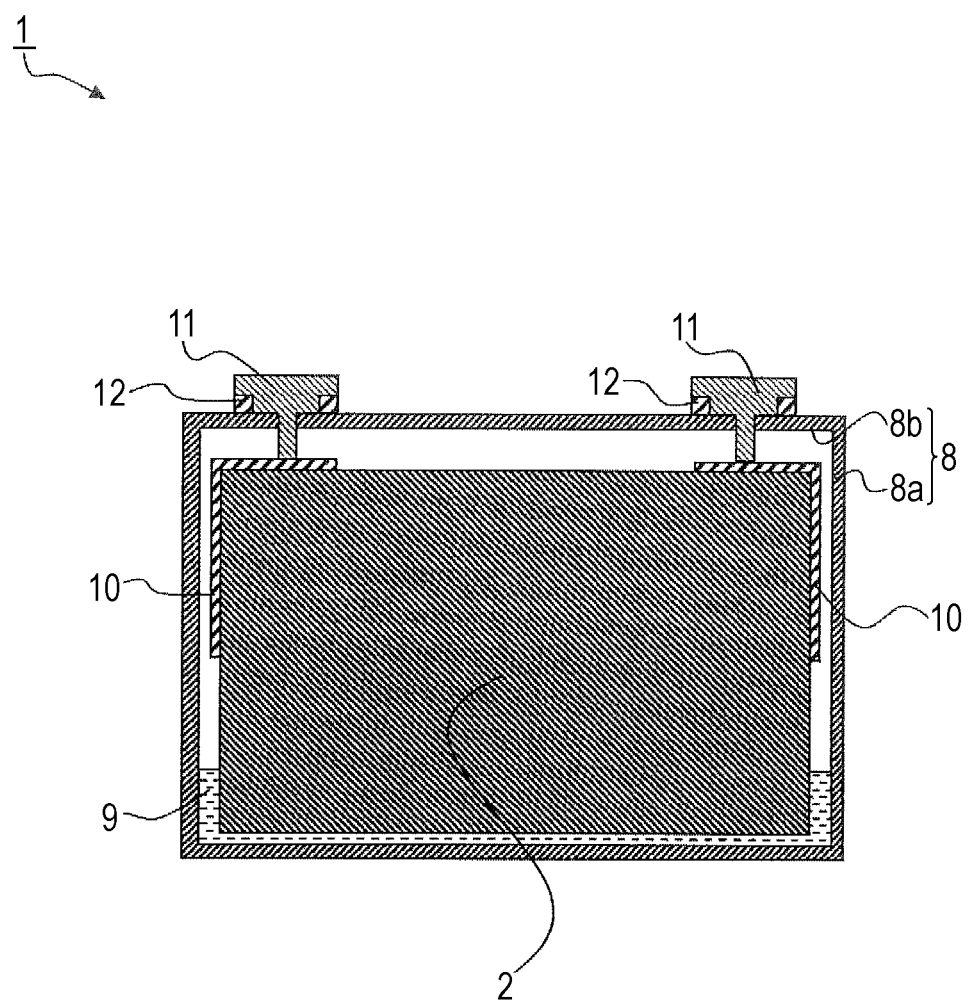
FIG. 7 is a sectional view of the battery that is taken along line VII-VII in FIG. 3.

As illustrated in FIG. 1, the nonaqueous electrolyte secondary battery 1 has a sealable case 8 in which an electrolyte solution 9 and the electrode assembly 2 are to be arranged. As illustrated in FIG. 1 and FIG. 7, the case 8 has a case body 8a which is open toward one direction and holds the electrode assembly 2 and the electrolyte solution 9, and a lid plate 8b for closing an opening in the case body 8a.

The positive electrode 3 is in a rectangular form, such as a band form. The thickness of the positive electrode 3 is usually from 35 to 250 μm.

Figure 5:
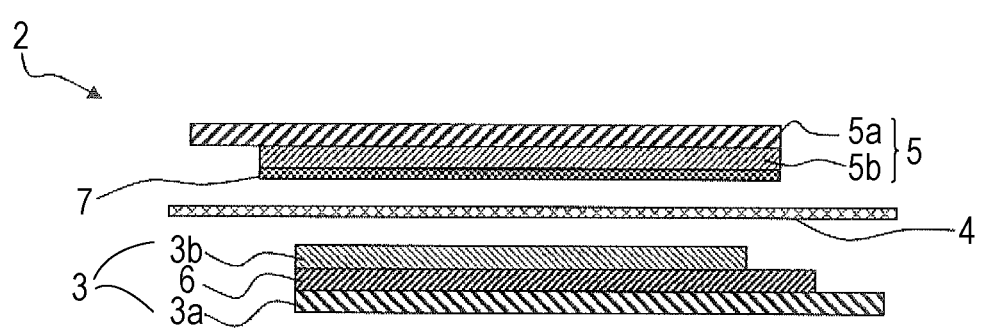
FIG. 5 is a sectional view that schematically illustrates an example of a positive electrode, an insulating layer, a separator and a negative electrode that are stacked.
Figure 6:
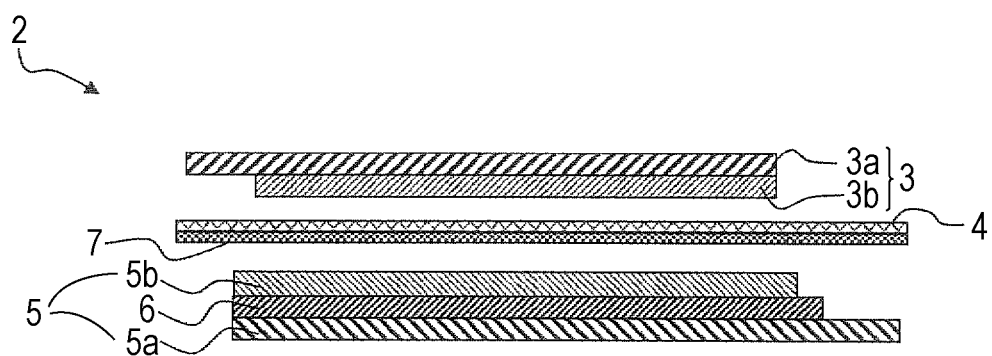
FIG. 6 is a sectional view that schematically illustrates another example of the positive electrode, the insulating layer, the separator and the negative electrode that are stacked.

As illustrated in each of FIGS. 5 and 6, the positive electrode 3 has an electrode in a sheet form, and a composite layer 3b containing active material particles and arranged to cover at least one of the two surfaces of the electrode substrate 3a. Specifically, the positive electrode 3 has a band-form electrode substrate 3a, and a composite layer 3b arranged on the negative-electrode-5-side of the electrode substrate 3a. The composite layer 3b of the positive electrode 3 is arranged to face the composite layer 5b of the negative electrode 5.

The material of the electrode substrate 3a of the positive electrode 3 is, for example, aluminum. The electrode substrate 3a may be in a film form. The thickness of the electrode substrate 3a may be from 5 to 50 μm.

The composite layer 3b of the positive electrode 3 extends, for example, along at least one of the two surfaces of the electrode substrate 3a of the positive electrode 3. The composite layer 3b of the positive electrode 3 contains positive active material particles, a conducting agent, and a binder. The composite layer 3b of the positive electrode 3 is made porous by at least a gap between the active material particles. The thickness of the composite layer 3b of the positive electrode 3 may be from 30 to 200 μm.

The content of active material particles in the composite layer 3b of the positive electrode 3 is preferably 70% or more by mass, more preferably 85% or more by mass in order to make the energy density of the energy storage device 1 higher. Moreover, the content of the active material particles in the composite layer 3b of the positive electrode 3 is preferably 99% or less by mass, more preferably 96% or less by mass to make better the applicability of a positive composite (paste) that will be described later. In order to make the durability of the energy storage device 1 higher, the content of the active material particles in the composite layer 3b of the positive electrode 3 is preferably 98% or less by mass, more preferably 95% or less by mass.

The composite layer 3b of the positive electrode 3 may contain the conducting agent in a proportion of 2 to 10% by mass both inclusive. The composite layer 3b of the positive electrode 3 may contain the binder in a proportion of 2 to 10% by mass both inclusive.

The active material particles in the positive electrode 3 is made particulate, and contain an active material capable of occluding and releasing lithium ions in a proportion of 95% or more by mass. An average primary particle diameter D90 of the active material particles of the positive electrode 3 may be from 3 to 10 μm both inclusive.

The average primary particle diameter D90 is a particle diameter corresponding to the cumulative quantity of smaller 90%-particles out of the measured particles when the particle diameter of each of at least 500 primary particles is measured in accordance with a method described in the item "EXAMPLES".

The active material of the active material particles in the positive electrode 3 is, for example, a material represented by the following composition formula:

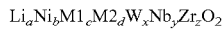

$$Li_aNi_bM1_cM2_dW_xNb_yZr_zO_2$$

wherein a, b, c, d, x, y and z satisfy the following: $0 \leq a \leq 1.2$, $0 \leq b \leq 1$, $0 \leq c \leq 0.5$, $0 \leq d \leq 0.5$, $0 \leq x \leq 0.1$, $0 \leq y \leq 0.1$, and $0 \leq z \leq 0.1$, and b+c+d=1; and M1 and M2 are each at least one element selected from the group consisting of Mn, Ti, Cr, Fe, Co, Cu, Zn, Al, Ge, Sn, and Mg.

Examples of the active material include $Li_pCoO_2$, $Li_pNiO_2$, $Li_pMn_2O_4$, $Li_pMnO_3$, $Li_pNi_qCo_{(1-q)}O_2$, and $Li_p$-$Ni_qMnrCo_{(1-q-r)}O_2$ in each of which $0<p \leq 1.3$, $0<q<1$, and $0<r<1$, such as $LiNi_{1/3}Mn_{1/3}CO_{1/3}O_2$ and $Li_pNi_qMn_{(2-q)}O_4$.

Other examples of the active material include polyanionic compounds such as $LiFePO_4$, $LiMnPO_4$, $LiNiPO_4$, $LiCoPO_4$, $Li_3V_2(PO_4)_3$, $Li_2MnSiO_4$, and $Li_2CoPO_4F$.

The elements or polyanions of each of these polyanion compounds may be partially substituted with one or more other elements or anionic species.

The surface of the active material particles in the positive electrode 3 may be covered with a metal oxide such as $ZrO_2$, MgO or $Al_2O_3$, or carbon.

Additional examples of the active material include electroconductive polymeric compounds such as disulfide, polypyrrole, polyaniline, poly-para-styrene, polyacetylene, and polyacene materials; and pseudo-graphite-structural carbonaceous material. However, the active material is not limited to these examples.

About the active material in the positive electrode 3, one of these compounds may be used singly, or two or more thereof may be used in any combination.

The conducting agent in the composite layer 3b of the positive electrode 3 may be in a particulate form. The material that forms the conducting agent particles in the composite layer 3b of the positive electrode 3 may be, for example, a metallic material or nonmetallic material. The metallic material of the conducting agent may be, for example, Cu or Ni. The nonmetallic material may be, for example, a carbonaceous material such as graphite, carbon black, acetylene black, or ketchen black.

The binder in the composite layer 3b of the positive electrode 3 is not particularly limited as far as the binder is a material stable against a solvent to be blended into the positive composite or the electrolyte solution 9, and further stable against oxidizing or reducing reaction when the energy storage device is charged or discharged. Examples of the binder in the composite layer 3b of the positive electrode 3 include thermoplastic resins, such as polytetrafluoroethylene (PTFE), polyvinylidene fluoride (PVDF), polyethylene, and polypropylene; and polymers having rubber elasticity, such as ethylene-propylene-diene terpolymer (EPDM), sulfonated EPDM, styrene-butadiene rubber (SBR), and fluorine-contained rubber. About the binder, one of such materials is used singly, or two or more thereof are used in any combination.

In the positive electrode 3, the composite layer 3b and another composite layer may be arranged to cover both surfaces of the electrode substrate 3a, respectively.

In the meantime, the negative electrode 5 is in a rectangular form such as a band form. The thickness of the negative electrode 5 may be from 35 to 250 μm. As illustrated in each of FIGS. 5 and 6, the negative electrode 5 has a sheet type electrode substrate 5a and a composite layer 5b containing active material particles and arranged to cover at least one of the two surfaces of the electrode substrate 5a. Specifically, the negative electrode 5 includes, for example, a band-form electrode substrate 5a, and a composite layer 5b arranged on the positive-electrode-3-side of the electrode substrate 5a. The composite layer 5b of the negative electrode 5 is arranged to face the composite layer 3b of the positive electrode 3.

The material of the electrode substrate 5a of the negative electrode 3 is, for example, copper. The electrode substrate 5a may be in a film form. The thickness of the electrode substrate 5a of the negative electrode 5 may be from 5 to 50 μm both inclusive.

The composite layer 5b of the negative electrode 5 extends, for example, along at least one of the two surfaces of the electrode substrate 5a of the negative electrode 5. The composite layer 5b of the negative electrode 5 contains active material particles and a binder, and may further contain a conducting agent. The composite layer 5b of the negative electrode 5 is made porous by at least a gap between the active material particles. The thickness of the composite layer 5b of the negative electrode 5 may be from 30 to 200 μm both inclusive.

The content of the active material particles in the composite layer 5b of the negative electrode 5 is preferably 80% or more by mass, more preferably 90% or more by mass in order to make the energy density of the energy storage device 1 higher. Moreover, the content of the active material particles composite layer 5b of the negative electrode 5 is preferably 99% or less by mass, more preferably 98% or less by mass to make the energy storage device 1 better in durability.

The composite layer 5b of the negative electrode 5 may contain the conducting agent in a proportion of 0 to 10% by mass both inclusive. The composite layer 5b of the negative electrode 5 may contain the binder in a proportion of 1 to 10% by mass both inclusive.

The active material particles in the negative electrode 5 is made particulate, and contain, in a proportion of 95% or more by mass, an active material capable of contributing to electrode reactions of charge reaction and discharge reaction in the negative electrode 5.

The average primary particle diameter D90 of the active material particles of the negative electrode 5 is preferably 3 μm or more, more preferably 4 μm or more. Moreover, the average primary particle diameter D90 of the active material particles in the negative electrode 5 is preferably 18 μm or less, more preferably 12 μm or less.

When the average primary particle diameter D90 of the active material particles in the negative electrode 5 is 3 μm or more, lowering of capacity retention ratio is suppressed. Moreover, when the average primary particle diameter D90 of the active material particles in the negative electrode 5 is 18 μm or less, the energy storage device can be further improved in power characteristics.

The average primary particle diameter D90 of the active material particles in the negative electrode 5 is determined in the same way as the average primary particle diameter D90 of the active material particles in the positive electrode 3.

The active material of the active material particles in the negative electrode 5 is, for example, a carbonaceous material, an element alloyable with lithium, an alloy, a metal oxide, a metal sulfide, or a metal nitride.

Examples of the carbonaceous material include amorphous carbons such as non-graphitizable carbon (hard carbon) and easily graphitizable carbon (soft carbon), and graphite.

Examples of the element alloyable with lithium include Al, Si, Zn, Ge, Cd, Sn, and Pb. These elements may be used singly, or in any combination of two or more thereof.

Examples of the alloy include Ni—Si alloy, Ti—Si alloy, and other alloys each containing a transition metal element.

Examples of the metal oxide include amorphous tin oxides such as $SnB_{0.4}P_{0.6}O_{3.1}$, tin silicon oxides such as $SnSiO_3$, silicon oxides such as SiO, and lithium titanates each having a spinel structure, such as $Li_{4+x}Ti_5O_{12}$.

Examples of the metal sulfide include lithium sulfides such as $TiS_2$, molybdenum sulfides such as $MoS_2$, and iron sulfides such as FeS, $FeS_2$ and $Li_xFeS_2$.

Out of these examples, the active material of the active material particles in the negative electrode 5 is preferably non-graphitizable carbon.

The binder in the composite layer 5b of the negative electrode 5 is not particularly limited as far as the binder is a material stable against a solvent to be blended into a positive composite or the electrolyte solution 9, and further stable against oxidizing or reducing reaction when the energy storage device is charged or discharged. Examples of the binder in the composite layer 5b of the negative electrode 5 include thermoplastic resins, such as carboxymethylcellulose, polytetrafluoroethylene (PTFE), polyvinylidene fluoride (PVDF), polyethylene, and polypropylene; and polymers having rubber elasticity, such as ethylene-propylene-diene terpolymer (EPDM), sulfonated EPDM, styrene-butadiene rubber (SBR), and fluorine-contained rubber. One of such materials is used singly, or two or more thereof are used in any combination.

The binder in the composite layer 5b of the negative electrode 5 is preferably carboxymethylcellulose since a composite for producing the composite layer 5b, can be prepared in which the active material is stably dispersed in an aqueous solvent. Carboxymethylcellulose may be in the form of a salt thereof.

In the negative electrode 5, the composite layer 5b and another composite layer may be arranged to extend along both surfaces of the electrode substrate 5a, respectively.

The insulating layer 7 is a layer arranged between the positive electrode 3 and the negative electrode 5 to prevent a short circuit between the positive electrode 3 and the negative electrode 5. Specifically, the insulating layer 7 is arranged to contact the composite layer 5b of the negative electrode 5. The insulating layer 7 is arranged between the separator 4 and the composite layer 5b of the negative electrode 5. The insulating layer 7 contains at least electrically insulating particles, and further contains a binder.

The insulating layer 7 is made porous by a gap between the electrically insulating particles in such a manner that Li ions and others can transfer between the positive electrode 3 and the negative electrode 5.

The insulating layer 7 contains the electrically insulating particles in a proportion that is preferably 30% or more by mass, more preferably 50% or more by mass to make the electrically insulating property thereof better.

When the insulating layer 7 is formed by a coating method, the content of the electrically insulating particles in the insulating layer 7 is preferably 99% or less by mass, more preferably 98% or less by mass to make this layer better in bondability to the composite layer and in shape-keeping performance.

The insulating layer 7 may contain the binder in a proportion of 1 to 10% by mass both inclusive. The electrically insulating property of the insulating layer 7 is higher than that of each of the composite layer 3b of the positive electrode 3 and the composite layer 5b of the negative electrode 5. The electrical conductivity of the insulating layer 7 is less than $10^{-6}$ S/m.

The electrically insulating particles are particles containing an electrically insulating material having an electrical conductivity less than $10^{-6}$ S/m in a proportion of 95% or more by mass.

An average primary particle diameter D90 of the electrically insulating particles is preferably 0.5 μm or more, more preferably 1 μm or more. Moreover, the average primary particle diameter D90 of the electrically insulating particles is preferably 10 μm or less, more preferably 8 μm or less.

When the average primary particle diameter D90 of the electrically insulating particles is 0.5 μm or more, it can be suppressed that the pore diameter becomes too small. Moreover, when the average primary particle diameter D90 of the electrically insulating particles is 10 μm or less, the thickness of the insulating layer can be made small with a higher certainty.

The average primary particle diameter D90 of the electrically insulating particles is determined in the same way as the average primary particle diameter D90 of the active material particles in the positive electrode 3.

The electrically insulating particles are preferably inorganic particles since the particles are also excellent in heat resistance. The electrically insulating particles may be particles other than inorganic particles.

Examples of the inorganic particles include oxide particles, nitride particles, ion crystalline particles, covalently bonded crystalline particles, clay particles, and particles made of a mineral-resource-originating substance or an artificial substance corresponding thereto.

Examples of the oxide particles (metal oxide particles) include iron oxide, $SiO_2$, $Al_2O_3$, $TiO_2$, $BaTiO_2$, ZrO, and alumina-silica complex oxide particles.

Examples of the nitride particles include aluminum nitride and silicon nitride particles.

Examples of the ion crystalline particles include calcium fluoride, barium fluoride, and barium sulfate particles.

Examples of the covalently bonded crystalline particles include silicon and diamond particles.

Examples of the clay particles include talc and montmorillonite particles.

Examples of the particles made of a mineral-resource-originating substance or an artificial substance corresponding thereto include boehmite (alumina hydrate), zeolite, apatite, kaolin, mullite, spinel, olivine, sericite, bentonite, and mica particles.

A fired body is usable which is obtained by firing a hydrate-containing natural mineral (such as any one of the above-mentioned clays and mineral-resource-originating substances).

The electrically insulating particles may be particles produced to have electrically insulating property by applying a surface treatment with an electrically insulating material (for example, a material constituting the above-mentioned electrically insulating inorganic particles) to the surface of electroconductive particles, such as metallic particles, oxide particles such as $SnO_2$ and tin-indium oxide (ITO), or carbonaceous particles of carbon black, graphite or some other.

The inorganic particles may be particles of only one species of the above-mentioned particle species or particles of a mixture of two species thereof, or particles of a species obtained by compositing two or more of the above-mentioned material species.

The species of the inorganic particles is preferably at least one species selected from $SiO_2$ particle, $Al_2O_3$ particle, and alumina-silica composite oxide particle species with each other.

Examples of the binder in the insulating layer 7 include polyacrylonitrile, polyvinylidene fluoride (PVDF), a copolymer made from vinylidene fluoride and hexafluoropropylene, polytetrafluoroethylene, polyhexafluoropropylene, polyethylene oxide, polypropylene oxide, polyphosphazene, polysiloxane, polyvinyl acetate, polyvinyl alcohol, polymethyl methacrylate, polyacrylic acid, polymethacrylic acid, styrene-butadiene rubber, nitrile-butadiene rubber, polystyrene, and polycarbonate.

The binder in the insulating layer 7 is preferably polyacrylonitrile, polyvinylidene fluoride, polyhexafluoropropylene, polyacrylic acid, polymethacrylic acid, styrene-butadiene rubber, or polyethylene oxide since the binder is more stable in electrochemical property.

The energy storage device 1 of the present embodiment satisfies the following relational expression (1): $-0.8 \leq \text{Log } B - \text{Log } A \leq 1.0$ in which in the distribution of pores in the composite layer 5b of the negative electrode 5, the pore peak diameter is represented by A (μm), and in the distribution of pores in the insulating layer 7, the pore peak diameter is represented by B (μm).

In the energy storage device 1 of the embodiment, the ion conductivity of the outer surface of the negative electrode can be even, and the generation of any ununiformed reaction in the plane direction of the device 1 can be suppressed. In this way, a temporary power-decrease (temporary deterioration) can be suppressed which is generated immediately after charge-discharge cycles. The fact that A (μm) and B (μm) satisfy the relational expression (1) contributes largely to an improvement in the cycle performance of the energy storage device 1.

About the relational expression (1), A and B preferably satisfy "$-0.6 \leq \text{Log } B - \text{Log } A$", and more preferably satisfy "$-0.3 \leq \text{Log } B - \text{Log } A$". When A and B satisfy "$-0.6 \leq \text{Log } B - \text{Log } A$", it can be suppressed that the ion conducting performance of the insulating layer becomes extremely shorter as compared with that of the composite layer.

About the relational expression (1), A and B preferably satisfy "$\text{Log } B - \text{Log } A \leq 0.9$", and more preferably satisfy "$\text{Log } B - \text{Log } A \leq 0.5$". When A and B satisfy "$\text{Log } B - \text{Log } A \leq 0.9$", it can be suppressed that the ion conducting performance of the inside of the composite layer becomes extremely shorter as compared with that of the insulating layer.

The value A (the pore peak diameter in the pore distribution of the composite layer 5b of the negative electrode 5) is preferably from 0.5 to 1.5 μm both inclusive, more preferably from 0.9 to 1.2 μm both inclusive. The value B (the pore peak diameter in the pore distribution of the insulating layer 7) is preferably from 0.2 to 12.0 μm both inclusive, more preferably from 0.3 to 8.0 μm both inclusive, even more preferably from 0.5 to 3.5 μm both inclusive.

When the values A and B are within the respective ranges while the relational expression (1) is satisfied, the temporary deterioration can be further suppressed.

The pore peak diameter is determined by a mercury intrusion method according to JIS R1655 at room temperature. Specifically, the pore peak diameter is determined by a method described in the item "EXAMPLES".

The pore peak diameter is controllable by varying, for example, the pressing pressure when each of the negative electrode 5 and the insulating layer 7 is produced, the particle diameter of the active material particles or the inorganic particles, or the composition of any one of the composite layers or the insulating layer. Specifically, the pore peak diameter in the composite layer 5b can be made small by increasing the pressing pressure when the electrode substrate 5a and the composite layer 5b are pressed in the production of the negative electrode 5.

When the insulating layer 7 is formed on the composite layer 3b of the positive electrode 3 or the composite layer 5b of the negative electrode 5, the pore peak diameter in the insulating layer 7 can be made small by increasing the pressing pressure at the time of pressing a workpiece in which the positive electrode 3 or the negative electrode 5 is stacked onto the insulating layer 7.

Moreover, the pore peak diameter in the insulating layer 7 can be made small, for example, by increasing the pressing pressure at the time of pressing a workpiece in which the insulating layer 7 formed on a single surface of the separator 4 is stacked onto the separator 4.

The half band width of the pore peak diameter in the pore distribution of the insulating layer 7, this width being concerned with the value B, is usually from 0.3 to 0.8 both inclusive. The half band width is preferably from 0.4 to 0.7 both inclusive.

The energy storage device 1 of the present embodiment preferably satisfies the following relational expression (2): $-3 \leq C - D \leq 6$, and more preferably satisfies the following relational expression (2): $0 \leq C - D \leq 3$ in which the average primary particle diameter D90 of the active material particles in the composite layer 5b of the negative electrode 5 is represented by C (μm), and the average primary particle diameter D90 of the electrically insulating particles in the insulating layer is represented by D (μm).

When the energy storage device 1 satisfies the relational expression (2) as described above while satisfying the relational expression (1), the temporary deterioration can be further suppressed. Specifically, when this device 1 satisfies the relational expression (2), the ion conductivity on the outer surface of the negative electrode is made even so that ununiformed reaction in the plane direction can be suppressed. Satisfying the relational expression (2) contributes largely to an improvement in the cycle performance of this device 1.

The value C (the average primary particle diameter D90 of the active material particles in the composite layer 5b of the negative electrode 5) is preferably from 3.0 to 18.0 μm both inclusive, more preferably from 4.0 to 12.0 μm both inclusive. The value D (the average primary particle diameter D90 of the electrically insulating particles in the insulating layer 7) is preferably from 0.5 to 14.0 μm both inclusive, more preferably from 1.0 to 10.0 μm both inclusive. When the values C and D are within the respective ranges while the relational expression (1) is satisfied, the temporary deterioration can be further suppressed.

As illustrated in, for example, each of FIGS. 5 and 6, in the electrode assembly 2, the composite layer 5b of the negative electrode 5 has edges located outside edges of the composite layer 3b of the positive electrode 3, which the negative electrode 5 faces. In other words, as illustrated in each of FIGS. 5 and 6, both edges of the composite layer 5b of the negative electrode 5 are located outside both edges of the composite layer 3b of the positive electrode 3 in the width direction of the electrode assembly 2. At both sides of the electrode assembly 2 in the width direction, the composite layer 5b of the negative electrode 5 are protruded from the composite layer 3b of the positive electrode 3. Therefore, ion components, such as Li ions, can be occluded into the active material of the composite layer 5b of the negative electrode 5, these ion components being transferred from the composite layer 3b of the positive electrode 3 toward the negative electrode 5 when the energy storage device 1 is charged.

As illustrated in each of FIGS. 5 and 6, the energy storage device 1 of the present embodiment may have at least one of an intermediate layer 6 arranged between the electrode substrate 3a of the positive electrode 3 and the composite layer 3b of the positive electrode 3, and an intermediate layer arranged between the electrode substrate 5a of the negative electrode 5 and the composite layer 5b of the negative electrode 5.

As illustrated in, for example, FIG. 5, the intermediate layer 6 is arranged to be protruded outside one of the edges of the composite layer 3b of the positive electrode 3, and further to cause the protruded region to face one of the edges of the composite layer 5b of the negative electrode 5.

The intermediate layer 6 contains a conducting agent and a binder. Since the intermediate layer 6 contains the conducting agent, the intermediate layer 6 functions as a path for electrons between the electrode substrate 3a of the positive electrode 3 and the composite layer 3b of the positive electrode 3. Moreover, since the intermediate layer 6 contains the binder, separation between the electrode substrate 3a of the positive electrode 3 and the composite layer 3b of the positive electrode 3 can be prevented. The thickness of the intermediate layer 6 may be from 0.1 to 10 µm.

The intermediate layer 6 preferably has a sufficient adhesiveness onto the corresponding electrode substrate (for example, the electrode substrate 3a of the positive electrode). In other words, for example, the intermediate layer 6 preferably has a sufficient strength against separation from the electrode substrate. The intermediate layer 6 preferably has higher electron conductivity than the corresponding composite layer (for example, the composite layer 3b of the positive electrode).

The conducting agent in the intermediate layer 6 may be in a particulate form. Moreover, the conducting agent is usually formed by a material having an electrical conductivity of $10^{-6}$ S/m or more. Examples of the conducting agent in the intermediate layer 6 include carbonaceous materials such as carbon black, acetylene black and ketchen black, and metallic materials such as iron, nickel, copper and aluminum. The intermediate layer 6 contains the conducting agent in a proportion preferably from 5 to 99% by mass, more preferably from 10 to 98% by mass. When the intermediate layer 6 contains the conducting agent in a proportion within the range, the electroconductivity of the intermediate layer 6 can be kept with a higher certainty.

The binder in the intermediate layer 6 may be at least one selected from the group consisting of chitin-chitosan derivatives, cellulose derivatives, fluororesins, synthetic rubbers, polyamide resins, polyimide resins, polyolefin resins, and polyacrylic resins.

The chitin-chitosan derivatives may be at least one selected from the group consisting of hydroxyalkylchitosans such as hydroxyethylchitosan, hydroxypropylchitosan, hydroxybutylchitosan, and alkylated chitosans.

The hydroxyalkylchitosans are each preferably a chitosan crosslinked by mixing this chitosan with, for example, an organic acid such as salicylic acid, pyromellitic acid, citric acid or trimellitic acid.

Examples of the cellulose derivatives include a Na salt of carboxymethylcellulose (Na-CMC), an ammonium salt of carboxymethylcellulose ($NH_4$-CMC), and carboxymethylcellulose (H-CMC).

Examples of the fluororesins include polyvinylidene fluoride and polytetrafluoroethylene.

Examples of the synthetic rubbers include styrene-butadiene rubber, acrylic rubber, and nitrile rubber.

Examples of the polyolefin resins include low-density polyethylene, high-density polyethylene, and polypropylene.

Examples of the polyacrylic resins include ethylene glycol dimethacrylate and propylene glycol dimethacrylate.

The intermediate layer 6 contains the binder in a proportion preferably from 1 to 95% by mass, more preferably from 2 to 90% by mass. When the intermediate layer 6 contains the binder in a proportion within the range, the intermediate layer 6 has an advantage of having both of electroconductivity and bonding performance with a higher certainty.

The separator 4 is a member of blocking electric connection between the positive electrode 3 and the negative electrode 5 and simultaneously allowing the electrolyte solution 9, which will be detailed later, to pass through this member. The separator 4 is made into, for example, a band form, and is arranged between the positive electrode 3 and the negative electrode 5 to block electric connection between the positive electrode 3 and the negative electrode 5. The separator 4 is larger in width than the composite layer 3b of the positive electrode 3 to prevent the short circuit with a higher certainty. The separator 4 is larger in width than the composite layer 5b of the negative electrode 5. The thickness of the separator 4 may be from 5 to 50 µm. In the present embodiment, the separator 4 contains no electrically insulating particles.

The separator 4 includes at least a sheet type separator substrate. The separator substrate may be porous. Examples of the material of the separator substrate include synthetic resin, natural resin, glass and ceramic materials. Specifically, the separator substrate is, for example, a woven fabric or nonwoven fabric made of synthetic fiber, natural fiber, glass fiber or ceramic fiber. More specifically, the separator substrate is, for example, a polyolefin finely porous membrane or a paper piece.

The separator substrate is preferably a woven fabric or nonwoven fabric made of synthetic fiber. Examples of the material of the synthetic fiber include polyacrylonitrile (PAN), polyamide (PA), polyester, polyethylene terephthalate (PET), and polyolefins (POs) such as polypropylene (PP) and polyethylene (PE). The synthetic fiber is preferably synthetic fiber made of a non-electroconductive resin and produced by combining respective fibers of two or more of these synthetic fiber materials.

The separator 4 may have a monolayered structure made of the separator substrate. The separator 4 may have a multilayered structure having the separator substrate and one or more layers other than the separator substrate.

As illustrated in FIG. 5, in the electrode assembly 2, the intermediate layer 6 is formed on the electrode substrate 3 of the positive electrode 3. As illustrated in FIG. 6, however, in the electrode assembly 2, the intermediate layer 6 may be formed on the electrode substrate 5a of the negative electrode 5. The exemplary embodiments of the intermediate layer 6 on the electrode substrate 3a of the positive electrode 3, as described with reference to FIG. 5, are applicable to the intermediate layer on the electrode substrate 5a of the negative electrode 5.

As described above, an example of the energy storage device 1 of the present embodiment may be the nonaqueous electrolyte secondary battery 1 illustrated in FIGS. 1 to 4.

Figure 2:
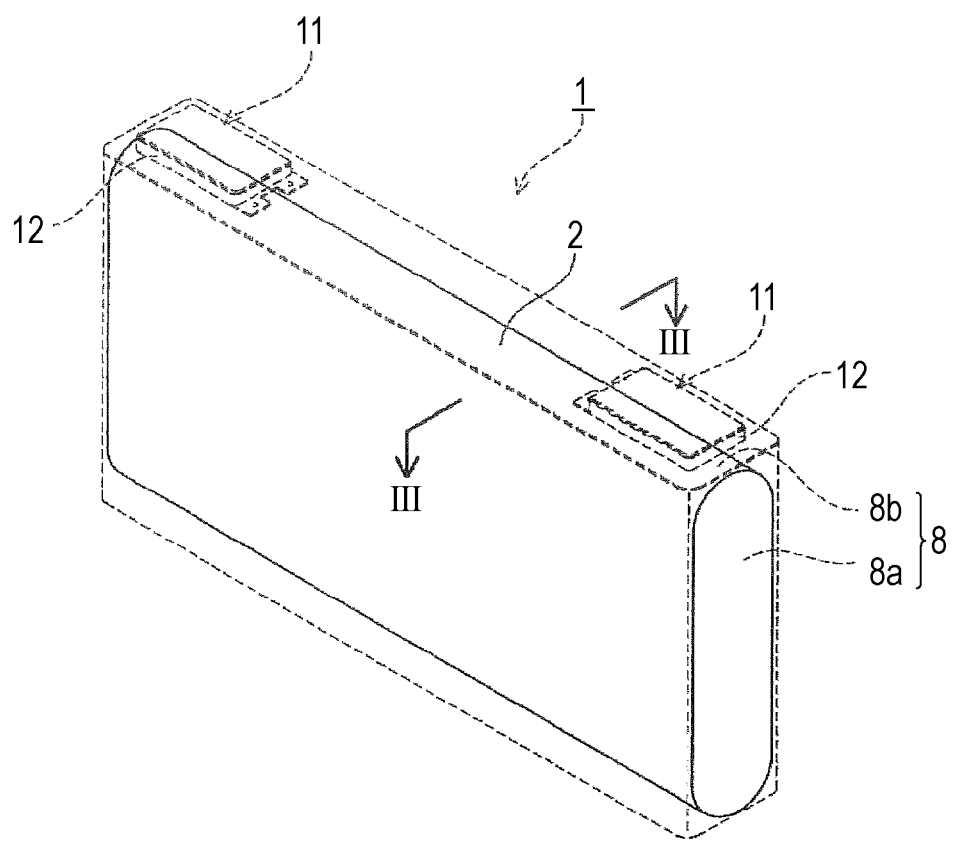
FIG. 2 is a schematic view illustrating the inside of the nonaqueous electrolyte secondary battery.
Figure 3:
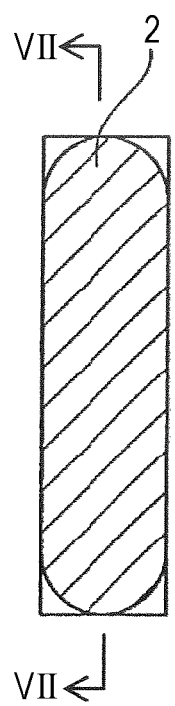
FIG. 3 is a sectional view of the battery that is taken along line III-III in FIG. 2.

As illustrated in FIGS. 2 to 4, the nonaqueous electrolyte secondary battery 1 includes the electrode assembly 2. As illustrated in, for example, FIG. 4, the electrode assembly 2 is a body obtained by winding up the positive electrode 3, the negative electrode 5, the separator 4, and the insulating layer 7 formed on the negative electrode 5 to be configured as the nonaqueous electrolyte secondary battery 1.

Specifically, the nonaqueous electrolyte secondary battery includes the case 8, the electrolyte solution 9 held in the case 8, two external electrically insulating members 12 fitted to an outside surface of the case 8, the electrode assembly 2 held in the case 8, two current collecting units 10 connecting electrically to the electrode assembly 2, and two external terminals 11 connected electrically to the two current collecting units 10, respectively.

As illustrated in FIGS. 1, 2 and 7, the case 8 has the case body 8a, which is open toward one direction and holds the electrode assembly 2, and the plate-form lid plate 8b for closing the opening in the case body 8a. The case body 8a and the lid plate 8b are made of, for example, aluminum, or aluminum based metallic material such as any aluminum alloy, and are welded to each other.

The lid plate 8b is, for example, rectangular when viewed from one of both the surface sides thereof. The lid plate 8b is formed to close the opening in the case body 8a airtightly. The lid plate 8b has therein two openings.

The two external electrically insulating members 12 are fitted to the outside surface of the lid plate 8b. An opening is made in each of the external electrically insulating members 12. The lid plate 8b and the external electrically insulating members 12 are arranged in such a manner that one of the two openings in the lid plate 8b is continuous to the opening in one of the two external electrically insulating members 12. The other opening in the lid plate 8b and the opening in the other external electrically insulating member 12 are in the same manner. One of the external terminals 11 is partially arranged inside each of two pairs of the continuous openings. Moreover, a non-illustrated electrically insulating member is further arranged between each of the external terminals 11 and the lid plate 8b, so that the electrically insulating member insulates each of the external terminals 11 and the lid plate 8b electrically from each other.

The external terminals 11 are connected, respectively, to the two current collecting units 10 connected to the electrode assembly 2. Additionally, each of the current collecting units 10 is electrically connected to the electrode assembly 2. Specifically, the two external terminals 11 are electrically connected through the two current collecting units 10, respectively, to the electrode assembly 2. The external terminals 11 are made of, for example, aluminum, or aluminum based metallic material such as any aluminum alloy.

The external electrically insulating members 12 are ones for the positive electrode and the negative electrode; the same matter is applied to the current collecting units 10 as well as the external terminals 11. The external electrically insulating member 12, the current collecting unit 10 and the external terminal 11 for the positive electrode are each arranged at one of both the end sides in the longitudinal direction of the lid plate 8b. In the meantime, the external electrically insulating member 12, the current collecting unit 10 and the external terminal 11 for the negative electrode are each arranged at the other end side in the longitudinal direction of the lid plate 8b.

As illustrated in FIGS. 2 and 7, the case body 8a of the case 8 holds therein the electrode assembly 2. In the case 8, the electrode assembly 2, which is a single body, may be held, or plural electrode assembles may be held. In the latter case, the electrode assembles are electrically connected to each other in parallel.

As illustrated in FIG. 7, the case body 8a holds therein the electrolyte solution 9 as an electrolyte. The electrode assembly 2 is immersed in the electrolyte solution 9. In other words, the electrode assembly 2 and the electrolyte solution 9 are enclosed in the case body 8a.

Usually, the electrolyte solution 9 may be a nonaqueous electrolyte solution in which an electrolyte salt is dissolved in an organic solvent. In the case 8, the composite layer 3b of the positive electrode 3, the composite layer 5b of the negative electrode 5, the insulating layer 7 and the separator 4 are impregnated with the electrolyte solution 9. As illustrated in, for example, FIG. 7, a portion of the electrolyte solution 9 remains as an extra electrolyte solution in the case 8, this portion being a portion with which the composite layer 3b of the positive electrode 3, the composite layer 5b of the negative electrode 5, the insulating layer 7 and the separator 4 are not impregnated. The electrolyte solution 9 is not limited to the solution referred to above, and may be any electrolyte solution used generally for lithium ion batteries and others.

The organic solvent may be a nonaqueous solvent, examples of which include cyclic carbonates such as propylene carbonate, ethylene carbonate, butylene carbonate, chloroethylene carbonate and vinylene carbonate; cyclic esters such as γ-butyrolactone and γ-valerolactone; linear carbonates such as dimethyl carbonate, diethyl carbonate and ethylmethyl carbonate; linear esters such as methyl formate, methyl acetate, and methyl butyrate; tetrahydrofuran and derivatives thereof, ethers such as 1,3-dioxane, 1,4-dioxane, 1,2-dimethoxyethane, 1,4-dibutoxyethane, and methyl diglyme; nitriles such as acetonitrile and benzonitrile; dioxolane and derivatives thereof, and ethylene sulfide, sulfolane and sultone, and respective derivatives thereof. As the organic solvent, one of such compounds may be used singly, or two or more thereof may be used in the form of, for example, a mixture. However, the organic solvent is not limited to these examples.

Examples of the electrolyte salt include inorganic ions each containing at least one of lithium (Li), sodium (Na) and potassium (K), such as $LiClO_4$, $LiBF_4$, $LiAsF_6$, $LiPF_6$, LiSCN, LiBr, LiI, $Li_2SO_4$, $Li_2B_{10}Cl_{10}$, $NaClO_4$, NaI, NaSCN, NaBr, $KClO_4$, and KSCN; and $LiCF_3SO_3$, $LiN(CF_3SO_2)_2$, $LiN(C_2F_5SO_2)_2$, $LiN(CF_3SO_2)(C_4F_9SO_2)$, $LiC(CF_3SO_2)_3$, $LiC(C_2F_5SO_2)_3$, $(CH_3)_4NBF_4$, $(CH_3)_4NBr$, $(C_2H_5)_4NClO_4$, $(C_2H_5)_4NI$, $(C_3H_7)_4NBr$, $(n-C_4H_9)_4NClO_4$, $(n-C_4H_9)_4NI$, $(C_2H_5)_4N$-maleate, $(C_2H_5)_4N$-benzoate, $(C_2H_5)_4N$-phtalate, lithium stearylsulfonate, lithium octylsulfonate, lithium dodecylbenzenesulfonate, and other organic ion salts. As the electrolyte salt, one of such ionic compounds is used singly, or two or more thereof are used in a mixture form.

The electrolyte solution 9 (nonaqueous electrolyte) may further contain known additives.

Hereinafter, a method for producing the nonaqueous electrolyte secondary battery 1, as one example of the energy storage device of the present embodiment, will be described.

In the method for producing the nonaqueous electrolyte secondary battery 1, for example, a sheet type positive electrode 3, a sheet type negative electrode 5 and a separator 4 are stacked onto each other. For example, an insulating layer 7 is arranged to be put onto a single surface of any one of the positive electrode 3, the negative electrode 5 and the separator 4. The stacked body is wound up to produce an electrode assembly 2. Furthermore, the produced electrode assembly 2 and an electrolyte solution 9 are held in the case 8.

Specifically, the method for producing the nonaqueous electrolyte secondary battery 1 includes, for example, the following: producing a negative electrode 5 (step 1); producing a positive electrode 3 (step 2); forming an insulating layer 7 onto at least one surface of the negative electrode 5, the positive electrode 3, or a separator 4 (step 3); stacking the negative electrode 5, the positive electrode 3, the separator 4, and the insulating layer 7 onto each other, and then winding up the stacked body to produce an electrode assembly 2 (step 4); and holding the electrode assembly 2 and an electrolyte solution 9 into the case to fabricate the battery (step 3).

In the production of the negative electrode (step 1), for example, active material particles and a binder for the negative electrode 5 are mixed with each other, and this mixture is added to a solvent. The resultant is then kneaded to prepare a negative composite. This negative composite is applied onto a single surface of a band-form electrode substrate 5a. The application of the negative composite is attained to make the width of the applied composite larger than that of a composite layer 3b of the positive electrode 3 in the width direction of the electrode substrate 5a of the negative electrode 5. The solvent is then evaporated from the applied negative composite. As required, the resultant composite layer 5b of the negative electrode 5 is pressed. In this way, the negative electrode 5 is produced, in which the composite layer 5b is formed on the electrode substrate 5a.

In the production of the positive electrode (step 2), at least a composite layer is formed and, if necessary, an intermediate layer is further formed. Specifically, the positive electrode production (step 2) includes: applying an intermediate-layer-forming composition containing a conducting agent (carbonaceous material), a binder and a solvent onto one of the two surfaces of an electrode substrate 3a to form an intermediate layer 6 (step 21), and applying a positive composite containing a positive active material, a conducing aid, a binder and a solvent onto the applied intermediate-layer-forming composition to form a composite layer 3b of the positive electrode 3 (step 22).

In order to form the composite layer of the positive electrode, for example, the positive active material, the conducting agent, and the binder are mixed with each other, and this mixture is added to the solvent. The resultant is kneaded to prepare the positive composite. This positive composite is applied onto the electrode substrate 3a of the positive electrode 3 or the intermediate layer 6. The solvent is then evaporated from the applied positive composite. When the intermediate layer 6 is formed in the positive electrode production (step 2), the positive composite is applied onto the intermediate layer 6 to form the composite layer 3b of the positive electrode 3.

In order to form the intermediate layer, for example, the conducting agent (carbonaceous material) and the binder are mixed with each other, and this mixture is added to the solvent. The resultant is kneaded to prepare the intermediate-layer-forming composition. This intermediate-layer-forming composition is applied onto one of the two surfaces of the electrode substrate 3a of the positive electrode 3. Furthermore, the solvent is evaporated from the applied intermediate-layer-forming composition. As required, the composite layer 3b of the positive electrode 3 and the intermediate layer 6 are pressed.

In the formation of the insulating layer (step 3), for example, electrically insulating particles are mixed with a binder, and this mixture is added to a solvent. The resultant is then kneaded to prepare an insulating-layer-forming composition. This insulating-layer-forming composition is applied to, for example, the composite layer 3b of the positive electrode 3, the composite layer 5b of the negative electrode 5, or a single surface of the separator 4. The solvent is then evaporated from the applied insulating-layer-forming composition. As required, the insulating layer 7 is pressed together with the negative electrode 5 or the separator 4.

In each of the positive electrode production (step 2), the negative electrode production (step 1) and the insulating layer formation (step 3), the method for the application may be an ordinary method.

In the production of the electrode assembly (step 4), the positive electrode 3 and the negative electrode 5 are stacked onto each other in such a way that the formed composite layer 5b of the negative electrode 5 faces the formed composite layer 3b of the negative electrode 3. Additionally, the positive electrode 3 and the negative electrode 5 are stacked onto each other to locate the separator 4 and the insulating layer 7 between the positive electrode 3 and the negative electrode 5. At this time, it is preferred the insulating layer 7 is located nearer to the negative electrode 5 than the separator 4. Specifically, in order to produce the electrode assembly, the positive electrode 3, the negative electrode 5, the separator 4 and the insulating layer 7 are stacked onto each other in the state of making the respective longitudinal directions thereof consistent with each other. Specifically, the positive electrode 3 and the negative electrode 5 are arranged in such a way that the composite layer 3b of the positive electrode 3 faces the composite layer 5b of the negative electrode 5. The separator 4 is arranged between the positive electrode 3 and the negative electrode 5. The stacked positive electrode 3, negative electrode 5, separator 4 and insulating layer 7 are wound up into the longitudinal direction to produce the electrode assembly 2.

In the fabrication of the battery (step 5), a current collecting units 10 are connected to each of the positive electrode 3 and the negative electrode 5 in the produced electrode assembly 2. Next, the electrode assembly 2 and the current collecting units 10 connected to the electrode assembly 2 are arranged in the case body 8a of the case 8. When plural electrode assembles are used, for example, current collecting units 10 of the electrode assembles are electrically connected to each other in parallel and then the resultant is arranged in the case body 8a. Next, external terminals 11 in external electrically insulating members 12 fitted to a lid plate 8b are connected to the current collecting units 10 by fastening rivets or welding. Thereafter, the lid plate 8b is connected to the case body 8a.

Subsequently, in order to fabricate the battery, the electrolyte solution 9 is filled into the case 8 through solution-filling holes in the case 8. The solution-filling holes are sealed. The electrolyte solution 9 may be a solution prepared by blending $LiPF_6$ into a mixed solvent of ethylene carbonate (EC), dimethyl carbonate (DMC) and ethylmethyl carbonate (EMC) (the ratio by volume of EC/DMC/EMC=3/2/5). Furthermore, known additives may be added to the electrolyte solution 9.

Through this process, the nonaqueous electrolyte secondary battery 1 can be produced.

In the embodiment, the nonaqueous electrolyte secondary battery 1 as an energy storage device is described as an example. However, the energy storage device is not limited to the nonaqueous electrolyte secondary battery 1, and may be, for example, a capacitor. The energy storage device is preferably a nonaqueous electrolyte secondary battery, more preferably a lithium ion secondary battery. The energy storage device may be a capacitor, and may be specifically a lithium ion capacitor or ultra-capacitor.

The energy storage device of the present embodiment is as demonstrated above. However, the present invention is not limited to the demonstrated energy storage device. In other words, various forms equivalent to forms usable for ordinary energy storage devices may be used as far as the forms do not damage the advantageous effects of the invention.

EXAMPLES

The present invention will be described in more detail by way of working examples thereof. However, the invention is not limited to these examples.

Examples 1 to 85 and Comparative Examples 1 to 19

In each of the working examples and the comparative examples, a lithium ion secondary battery was produced as described below. Tables 1 to 3 described below show the average primary particle diameter D90 of active material particles in a negative electrode in each of the examples and the comparative examples, the average primary particle diameter D90 of electrically insulating particles therein, the pore peak diameter in a composite layer of the negative electrode therein, the pore peak diameter in an insulating layer therein, and others.

[Production of Positive Electrode]

Active material: $LiNi_{1/3}Mn_{1/3}CO_{1/3}O_2$, or $LiFePo_4$ particles

Conducting agent: acetylene black

Binder: polyvinylidene fluoride (PVDF)

Blend ratio (by mass): active material/acetylene black/PVDF=90/5/5

Electrode substrate of a positive electrode: aluminum film (thickness: 20 μm)

The active material, the conducting agent, the binder, and an organic solvent (NMP) were mixed with each other to prepare a positive composite. A predetermined amount of the positive composite (the mass per area of this composite after the composite was dried: 0.01 g/cm$^2$) was applied onto the aluminum film, and the resultant was dried to volatilize the organic solvent. In this way, a composite layer of the positive electrode was produced. Furthermore, the composite layer of the positive electrode and the aluminum film were pressed to produce the positive electrode.

[Production of Negative Electrode]

Active material: non-graphitizable carbon (hard carbon: HC) particles, artificial graphite, or spherical natural graphite Binder: styrene-butadiene rubber (SBR), and
Na carboxymethylcellulose (CMC)

Blend ratio (by mass): active material/SBR/CMC=96/2.5/1.5

Electrode substrate of the negative electrode: copper film (thickness: 10 μm)

The active material, the binder, and an organic solvent (NMP) were mixed with each other, and the mixture was kneaded. A predetermined amount of the kneaded product (the mass per area of this product after the product was dried: 0.05 g/cm$^2$) was applied onto a copper film, and the resultant was dried to volatilize the organic solvent. The resultant was further pressed to produce the negative electrode. After the pressing, this electrode had a porosity of 38%.

[Formation of Insulating Layer]

Inorganic particles (alumina particles), a binder (PVDF), a surfactant, and an organic solvent (NMP) were mixed with each other to prepare a slurry-form insulating-layer-forming composition.

The ratio by mass of the alumina particles to the binder was as follows: alumina particles/binder=97/3.

The insulating-layer-forming composition was applied onto the composite layer of the negative electrode, or onto (only a single surface of) a separator by a gravure printing method. After the application, the workpiece was dried. In this way, the insulating layer was produced, which in principle had a thickness of 5 μm.

In order to adjust the wettability of the outer surface of the composite layer of the negative electrode before the application of the insulating-layer-forming composition, the composite layer outer surface of the negative electrode was appropriately subjected to surface modifying treatment.

[Separator]

As the separator (separator substrate), the following was prepared: a polyolefin finely porous film having a Gurley air permeability of 280 s/100 cc and a thickness of 20 μm (trade name: "HIPORE ND420", manufactured by Asahi Kasei Corp.).

[Production of Electrode Assembly]

The positive electrode, the negative electrode, the separator and the insulating layer were staked onto each other to arrange, between the composite layer of the negative electrode and the separator, the insulating layer on one of the two surface sides of the composite layer of the negative electrode or on one of the two surface sides of the separator. The stacked body was wound up to produce an electrode assembly.

[Fabrication of Battery]

$LiPF_6$ was dissolved into a mixed solvent of propylene carbonate (PC), dimethyl carbonate (DMC) and ethylmethyl carbonate (EMC) (ratio by volume of PC/DMC/EMC=3/2/5) to give a concentration of 1 mol/L to prepare an electrolyte solution. Any additive was able to be further added to this electrolyte solution; however, no additive was added to this electrolyte solution. Thereafter, the electrode assembly and the electrolyte solution were enclosed in a rectangular case.

About each of the batteries produced once, the following were measured as described below: the average primary particle diameter D90 of active material particles in the negative electrode, the average primary particle diameter D90 of the electrically insulating particles, the pore peak diameter in the composite layer of the negative electrode, the pore peak diameter in the insulating layer, the thickness of the insulating layer, and others. The measured value of the thickness was the average of measured values obtained by measuring five points of the layer.

In order to measure the physical properties of the battery produced in each of the examples and the comparative examples, the battery was disassembled in the state of being discharged (2 V). The negative electrode and the insulating layer were taken out therefrom, sufficiently washed with dimethyl carbonate (DMC), and then subjected to vacuum drying at 25° C. All of the physical property measurements described below were conducted using samples of the negative electrode and samples of the insulating layer after the washing and drying.

<Average Primary Particle Diameter D90 of the Active Material Particles of the Negative Electrode>

A cross section of the negative electrode obtained by cutting the electrode in the thickness direction was processed using a cross section polisher (CP), and the processed cross section was observed through an SEM.

A measurement was conducted about the diameter of each of at least 500 active material particles picked up at random from particles observed in the SEM observed image. In the measurement of the diameter, the diameter of a minimum circumscribing circle of the particle was regarded as the diameter of the particles. In this way, the particle was regarded as a spherical particle. From particles smaller in particle diameter, out of the entire particles, the spherical volumes thereof were then cumulated to gain the cumulative volume. The particle diameter when the cumulative volume exceeded 90% was defined as the average primary particle diameter D90.

<Average Primary Particle Diameter D90 of the Electrically Insulating Particles>

The average primary particle diameter D90 of the electrically insulating particles contained in the insulating layer was also obtained in the same way as described above.

<Pore Peak Diameter Measurements>

The pore peak diameter in the composite layer of the negative electrode and that in the insulating layer were each obtained by measuring the pore distribution of the composite layer of the negative electrode and that of the insulating layer by a mercury intrusion method. A measuring device used was a device, in WIN 9400 series, manufactured by Micrometritics Instrument Corp. The measurement was according to JIS R1655.

Specifically, each of the pore peak diameters was obtained as follows:

1) The washed and dried negative electrode was used as it was, and the mercury intrusion porosity thereof was measured to obtain pore peak diameters X and Y in the pore distribution of the composite layer (when the negative electrode had only one peak, the diameters X and Y were regarded to be equal to each other).

2) The insulating layer was peeled off by polishing peeling with a tape, a cutter or some other. After the peeling, the mercury intrusion porosity of the sample was measured to obtain the pore peak diameter Z in the pore distribution of the insulating layer.

3) The pore diameter Z was defined as the pore peak diameter in the composite layer. Out of the natural logarithm of the pore peak diameter X and that of the pore peak diameter Y, a natural logarithm that is farther from the natural logarithm of Z was defined as the pore peak diameter. When X was equal to Y, Z was defined as the pore peak diameter in the insulating layer.

The pore peak diameter in the distribution of pores is obtained as follows: the diameter (μm) of the pores is represented by U, and the cumulative pore volume (mL/g) is represented by V; at this time, the differential value of a change in the cumulative pore volume to a change in the pore diameter (dV/d log U) is calculated out; a graph is drawn in which X axis represents log U, and Y axis represents dV/d log U; and at this time, the value of U that is a maximum value is defined as the pore peak diameter.

<Half Band Width of the Pore Peak Diameter in Each of the Pore Distributions>

At the pore peak diameter, the value of the half of dV/d log U was used as a y intercept to draw a line parallel in the X axis. At this time, out of the respective diameters of two points crossing the pore distribution, a smaller diameter and a larger diameter were represented by Dmin and Dmax, respectively. At this time, the value of "log(Dmax)−log (Dmin)" was defined as the half band width of the peak.

<Evaluation of Battery Performances>

About the battery of each of examples and comparative examples, battery performances were evaluated as described below. The result of each of the evaluations is represented as the average value of plural (n=3) results.

[Test for Checking Battery Capacity]

A test for checking the battery capacity was conducted in a thermostat of 25° C. Specifically, the test was as follows:
1) At a lower limit voltage of 2.4 V, a 4-ampere constant current discharge test was conducted.
2) At an upper limit voltage of 4.1 V, the battery was subjected to 4-ampere constant current and constant voltage charge for 3 hours. Thereafter, at a lower limit voltage of 2.4 V, the battery was subjected to 4-ampere constant current discharge in a discharge test.
3) The current capacity at the discharge item in the item 2) was defined as the battery capacity.

[Power Test at 25° C.]

The battery was adjusted to an SOC of 50%. Specifically, the value 1 C(A) of the battery was decided according to the capacity checking test just before the present test. The battery was then adjusted to an SOC of 50%, from the discharged state by charging at 25° C. and 0.5 C(A) for 1 hour.

The value 1 C(A) means a current value capable of attaining an electricity amount of Q1 (Ah) in an current application period of 1 hour when Q1 (Ah) is electricity amount discharged in the 4-ampere discharge test (the upper limit: 4.1 V; and the upper limit: 2.1 V) at 25° C. just before the present test. After the adjustment, a current application test was conducted under the following conditions:

Current application period: 10 seconds
Temperature: 25° C.
Current: 40 C in the discharge direction The resistance value, the power value and the power density of the battery were calculated in accordance with the following calculating expressions:

Resistance D1: (difference between 1-second voltage at discharge and voltage before current application)/current
Power W1: ("voltage before current application"−"lower limit voltage")/D1*(lower limit voltage)
Resistance D2: (difference between 10-second voltage at discharge and voltage before current application)/current
Power W2: ("voltage before current application"−"lower limit voltage")/D2*(lower limit voltage)
Weight power density: W1/(battery weight)
Voltage power density: W1/(battery volume)

After the current application test, the battery was again adjusted to an SOC of 50% by charging a quantity corresponding to the electric quantity discharged when the power of the battery was measured, at a current value of 6 A.

[Power Temporary Deterioration Test]

The resistance of the battery before the cycles was gained in the same way as in the above-mentioned power test at 25°

C. The battery was subjected to continuous 1000 cycles each including continuous discharge for 30 seconds and continuous charge for 30 seconds within 2 minutes at a current of 10 C in the state of the SOC of 50%. Within 2 hours of the end of the cycles, the battery was subjected to the same power test as described above, so that the resistance value D3 at the 10-second discharge was calculated out. The temporary deterioration ratio R3 was calculated according to D3/D2.

In Tables 1 to 3 are shown details of the batteries of the examples and the comparative examples, and evaluated results of the temporary deterioration ratio of the batteries. In Tables 1 to 3, A to I each represent a value described below. The result of the temporary deterioration of Example 1 is regarded as 100, and the value of the temporary deterioration ratio of each of the other examples is relative to the value 100 of Example 1. The value is smaller, the temporary deterioration is further suppressed.

A: the pore peak diameter (μm) in the composite layer of the negative electrode

B: the pore peak diameter (μm) in the insulating layer

C: the average primary particle diameter D90 (μm) of the active material particles in the negative electrode D: the average primary particle diameter D90 (μm) of the electrically insulating particles E: the value relative (to the value of Example 1) of the mass of the applied positive composite F: the value relative (to the value of Example 1) of the mass of the applied negative composite G: the value relative (to the value of Example 1) of the thickness of the insulating layer H: the value of "Log B−Log A"

I: the half band width of the pore peak diameter in the insulating layer

TABLE 1

| | C (μm) | D (μm) | C-D (μm) | Porosity ratio of negative composite layer (relative to value 100 of Example 1) | Ratio of binder amount in insulating layer (relative to value 100 of Example 1) | E: Relative value of applied amount of positive composite | F: Relative value of applied amount of negative composite | G: Relative value of thickness of insulating layer |
|---|---|---|---|---|---|---|---|---|
| Example 1 | 7.0 | 5.0 | 2.0 | 100 | 100 | 100 | 100 | 100 |
| Example 2 | 3.0 | 1.0 | 2.0 | 100 | 100 | 100 | 100 | 100 |
| Example 3 | 3.5 | 1.5 | 2.0 | 100 | 100 | 100 | 100 | 100 |
| Example 4 | 4.0 | 2.0 | 2.0 | 100 | 100 | 100 | 100 | 100 |
| Example 5 | 8.0 | 6.0 | 2.0 | 100 | 100 | 100 | 100 | 100 |
| Example 6 | 10.0 | 8.0 | 2.0 | 100 | 100 | 100 | 100 | 100 |
| Example 7 | 12.0 | 10.0 | 2.0 | 100 | 100 | 100 | 100 | 100 |
| Example 8 | 7.0 | 5.0 | 2.0 | Appropriately changed | 100 | 100 | Appropriately changed | 100 |
| Comparative Example 1 | 7.0 | 0.5 | 6.5 | 100 | 100 | 100 | 100 | 100 |
| Example 9 | 7.0 | 0.5 | 6.5 | 100 | 100 | 100 | 100 | 100 |
| Example 10 | 7.0 | 1.0 | 6.0 | 100 | 100 | 100 | 100 | 100 |
| Example 11 | 7.0 | 4.0 | 3.0 | 100 | 100 | 100 | 100 | 100 |
| Example 12 | 7.0 | 5.0 | 2.0 | 100 | 100 | 100 | 100 | 100 |
| Example 13 | 7.0 | 7.0 | 0.0 | 100 | 100 | 100 | 100 | 100 |
| Example 14 | 7.0 | 9.0 | −2.0 | 100 | 100 | 100 | 100 | 100 |
| Example 15 | 7.0 | 10.0 | −3.0 | 100 | 100 | 100 | 100 | 100 |
| Example 16 | 7.0 | 10.0 | −3.0 | 100 | 85 | 100 | 100 | 100 |
| Comparative Example 2 | 7.0 | 10.0 | −3.0 | 100 | 65 | 100 | 100 | 100 |
| Example 17 | 7.0 | 5.0 | 2.0 | 115 | 100 | 100 | 100 | 100 |
| Comparative Example 3 | 7.0 | 0.5 | 6.5 | 115 | 100 | 100 | 100 | 100 |
| Comparative Example 4 | 7.0 | 0.5 | 6.5 | 115 | 100 | 100 | 100 | 100 |
| Example 18 | 7.0 | 1.0 | 6.0 | 115 | 100 | 100 | 100 | 100 |
| Example 19 | 7.0 | 4.0 | 3.0 | 115 | 100 | 100 | 100 | 100 |
| Example 20 | 7.0 | 5.0 | 2.0 | 115 | 100 | 100 | 100 | 100 |
| Example 21 | 7.0 | 7.0 | 0.0 | 115 | 100 | 100 | 100 | 100 |
| Example 22 | 7.0 | 9.0 | −2.0 | 115 | 100 | 100 | 100 | 100 |
| Example 23 | 7.0 | 10.0 | −3.0 | 115 | 100 | 100 | 100 | 100 |
| Example 24 | 7.0 | 10.0 | −3.0 | 115 | 85 | 100 | 100 | 100 |
| Example 25 | 7.0 | 10.0 | −3.0 | 115 | 65 | 100 | 100 | 100 |
| Comparative Example 5 | 7.0 | 12.0 | −5.0 | 115 | 65 | 100 | 100 | 100 |
| Example 26 | 7.0 | 5.0 | 2.0 | 85 | 100 | 100 | 100 | 100 |
| Comparative Example 6 | 7.0 | 0.5 | 6.5 | 85 | 100 | 100 | 100 | 100 |
| Example 27 | 7.0 | 0.5 | 6.5 | 85 | 100 | 100 | 100 | 100 |
| Example 28 | 7.0 | 1.0 | 6.0 | 85 | 100 | 100 | 100 | 100 |
| Example 29 | 7.0 | 4.0 | 3.0 | 85 | 100 | 100 | 100 | 100 |
| Example 30 | 7.0 | 5.0 | 2.0 | 85 | 100 | 100 | 100 | 100 |

TABLE 1-continued

| | Arrangement of insulating layer | Positive active material | Negative active material | A | B | H (LogB-LogA) | I: Halfband width of pore peak diameter in insulating layer | Temporary deterioration ratio (relative to value 100 of Example 1) |
|---|---|---|---|---|---|---|---|---|
| Example 1 | On negative electrode | $LiNiMnCoO_2$ | HC | 1.0 | 2.0 | 0.3 | 0.5 | 100 |
| Example 2 | On negative electrode | $LiNiMnCoO_2$ | HC | 0.9 | 0.3 | −0.5 | 0.4 | 102 |
| Example 3 | On negative electrode | $LiNiMnCoO_2$ | HC | 0.9 | 0.4 | −0.4 | 0.4 | 115 |
| Example 4 | On negative electrode | $LiNiMnCoO_2$ | HC | 1.0 | 0.5 | −0.3 | 0.4 | 102 |
| Example 5 | On negative electrode | $LiNiMnCoO_2$ | HC | 1.0 | 2.5 | 0.4 | 0.5 | 99 |
| Example 6 | On negative electrode | $LiNiMnCoO_2$ | HC | 1.1 | 3.5 | 0.5 | 0.5 | 99 |
| Example 7 | On negative electrode | $LiNiMnCoO_2$ | HC | 1.2 | 8.0 | 0.8 | 0.6 | 108 |
| Example 8 | On negative electrode | $LiNiMnCoO_2$ | Artificial graphite | 1.0 | 2.0 | 0.3 | 0.5 | 114 |
| Comparative Example 1 | On negative electrode | $LiNiMnCoO_2$ | HC | 1.0 | 0.1 | −1.0 | 0.3 | 150 |
| Example 9 | On negative electrode | $LiNiMnCoO_2$ | HC | 1.0 | 0.2 | −0.8 | 0.4 | 120 |
| Example 10 | On negative electrode | $LiNiMnCoO_2$ | HC | 1.0 | 0.3 | −0.5 | 0.4 | 107 |
| Example 11 | On negative electrode | $LiNiMnCoO_2$ | HC | 1.0 | 0.7 | −0.2 | 0.4 | 98 |
| Example 12 | On negative electrode | $LiNiMnCoO_2$ | HC | 1.0 | 1.0 | 0.0 | 0.4 | 101 |
| Example 13 | On negative electrode | $LiNiMnCoO_2$ | HC | 1.0 | 3.0 | 0.5 | 0.5 | 105 |
| Example 14 | On negative electrode | $LiNiMnCoO_2$ | HC | 1.0 | 5.0 | 0.7 | 0.5 | 110 |
| Example 15 | On negative electrode | $LiNiMnCoO_2$ | HC | 1.0 | 8.0 | 0.9 | 0.6 | 117 |
| Example 16 | On negative electrode | $LiNiMnCoO_2$ | HC | 1.0 | 9.0 | 1.0 | 0.7 | 119 |
| Comparative Example 2 | On negative electrode | $LiNiMnCoO_2$ | HC | 1.0 | 12.0 | 1.1 | 0.7 | 145 |
| Example 17 | On negative electrode | $LiNiMnCoO_2$ | HC | 1.2 | 2.0 | 0.2 | 0.5 | 101 |
| Comparative Example 3 | On negative electrode | $LiNiMnCoO_2$ | HC | 1.2 | 0.1 | −1.1 | 0.3 | 160 |
| Comparative Example 4 | On negative electrode | $LiNiMnCoO_2$ | HC | 1.2 | 0.2 | −0.9 | 0.4 | 155 |
| Example 18 | On negative electrode | $LiNiMnCoO_2$ | HC | 1.2 | 0.3 | −0.6 | 0.4 | 109 |
| Example 19 | On negative electrode | $LiNiMnCoO_2$ | HC | 1.2 | 0.7 | −0.3 | 0.4 | 99 |
| Example 20 | On negative electrode | $LiNiMnCoO_2$ | HC | 1.2 | 1.0 | −0.1 | 0.4 | 103 |
| Example 21 | On negative electrode | $LiNiMnCoO_2$ | HC | 1.2 | 3.0 | 0.4 | 0.5 | 104 |
| Example 22 | On negative electrode | $LiNiMnCoO_2$ | HC | 1.2 | 5.0 | 0.6 | 0.5 | 106 |
| Example 23 | On negative electrode | $LiNiMnCoO_2$ | HC | 1.2 | 8.0 | 0.8 | 0.6 | 114 |
| Example 24 | On negative electrode | $LiNiMnCoO_2$ | HC | 1.2 | 9.0 | 0.9 | 0.7 | 116 |
| Example 25 | On negative electrode | $LiNiMnCoO_2$ | HC | 1.2 | 12.0 | 1.0 | 0.7 | 118 |
| Comparative Example 5 | On negative electrode | $LiNiMnCoO_2$ | HC | 1.2 | 14.0 | 1.1 | 0.8 | 156 |
| Example 26 | On negative electrode | $LiNiMnCoO_2$ | HC | 0.9 | 2.0 | 0.3 | 0.5 | 104 |
| Comparative Example 6 | On negative electrode | $LiNiMnCoO_2$ | HC | 0.9 | 0.1 | −1.0 | 0.3 | 165 |
| Example 27 | On negative electrode | $LiNiMnCoO_2$ | HC | 0.9 | 0.2 | −0.8 | 0.4 | 120 |
| Example 28 | On negative electrode | $LiNiMnCoO_2$ | HC | 0.9 | 0.3 | −0.5 | 0.4 | 109 |
| Example 29 | On negative electrode | $LiNiMnCoO_2$ | HC | 0.9 | 0.7 | −0.1 | 0.4 | 99 |
| Example 30 | On negative electrode | $LiNiMnCoO_2$ | HC | 0.9 | 1.0 | 0.0 | 0.4 | 103 |

TABLE 1-continued

TABLE 2

| | C (μμ) | D (μm) | C-D (μm) | Porosity ratio of negative composite layer (relative to value 100 of Example 1) | Ratio of binder amount in insulating layer (relative to value 100 of Example 1) | E: Relative value of applied amount of positive composite layer | F: Relative value of applied amount of negative electrode | G: Relative value of thickness of insulating layer |
|---|---|---|---|---|---|---|---|---|
| Example 31 | 7.0 | 7.0 | 0.0 | 85 | 100 | 100 | 100 | 100 |
| Example 32 | 7.0 | 9.0 | −2.0 | 85 | 100 | 100 | 100 | 100 |
| Example 33 | 7.0 | 10.0 | −3.0 | 85 | 100 | 100 | 100 | 100 |
| Example 34 | 7.0 | 10.0 | −3.0 | 85 | 85 | 100 | 100 | 100 |
| Comparative Example 7 | 7.0 | 10.0 | −3.0 | 85 | 65 | 100 | 100 | 100 |
| Comparative Example 8 | 7.0 | 12.0 | −5.0 | 85 | 65 | 100 | 100 | 100 |
| Example 35 | 7.0 | 5.0 | 2.0 | 100 | 100 | 140 | 140 | 100 |
| Comparative Example 9 | 7.0 | 0.5 | 6.5 | 100 | 100 | 140 | 140 | 100 |
| Example 36 | 7.0 | 0.5 | 6.5 | 100 | 100 | 140 | 140 | 100 |
| Example 37 | 7.0 | 1.0 | 6.0 | 100 | 100 | 140 | 140 | 100 |
| Example 38 | 7.0 | 4.0 | 3.0 | 100 | 100 | 140 | 140 | 100 |
| Example 39 | 7.0 | 5.0 | 2.0 | 100 | 100 | 140 | 140 | 100 |
| Example 40 | 7.0 | 7.0 | 0.0 | 100 | 100 | 140 | 140 | 100 |
| Example 41 | 7.0 | 9.0 | −2.0 | 100 | 100 | 140 | 140 | 100 |
| Example 42 | 7.0 | 10.0 | −3.0 | 100 | 100 | 140 | 140 | 100 |
| Example 43 | 7.0 | 10.0 | −3.0 | 100 | 85 | 140 | 140 | 100 |
| Comparative Example 10 | 7.0 | 10.0 | −3.0 | 100 | 65 | 140 | 140 | 100 |
| Example 44 | 7.0 | 5.0 | 2.0 | 100 | 100 | 70 | 70 | 100 |
| Comparative Example 11 | 7.0 | 0.5 | 6.5 | 100 | 100 | 70 | 70 | 100 |
| Example 45 | 7.0 | 0.5 | 6.5 | 100 | 100 | 70 | 70 | 100 |
| Example 46 | 7.0 | 1.0 | 6.0 | 100 | 100 | 70 | 70 | 100 |
| Example 47 | 7.0 | 4.0 | 3.0 | 100 | 100 | 70 | 70 | 100 |
| Example 48 | 7.0 | 5.0 | 2.0 | 100 | 100 | 70 | 70 | 100 |
| Example 49 | 7.0 | 7.0 | 0.0 | 100 | 100 | 70 | 70 | 100 |
| Example 50 | 7.0 | 9.0 | −2.0 | 100 | 100 | 70 | 70 | 100 |
| Example 51 | 7.0 | 10.0 | −3.0 | 100 | 100 | 70 | 70 | 100 |
| Example 52 | 7.0 | 10.0 | −3.0 | 100 | 85 | 70 | 70 | 100 |
| Comparative Example 12 | 7.0 | 10.0 | −3.0 | 100 | 65 | 70 | 70 | 100 |
| Example 53 | 18.0 | 5.0 | 13.0 | 100 | 100 | 100 | 100 | 100 |
| Example 54 | 18.0 | 5.0 | 13.0 | Appropriately changed | 100 | 100 | Appropriately changed | 100 |
| Comparative Example 13 | 18.0 | 0.5 | 17.5 | Appropriately changed | 100 | 100 | Appropriately changed | 100 |
| Comparative Example 14 | 18.0 | 0.5 | 17.5 | Appropriately changed | 100 | 100 | Appropriately changed | 100 |
| Example 55 | 18.0 | 1.0 | 17.0 | Appropriately changed | 100 | 100 | Appropriately changed | 100 |
| Example 56 | 18.0 | 4.0 | 14.0 | Appropriately changed | 100 | 100 | Appropriately changed | 100 |
| Example 57 | 18.0 | 5.0 | 13.0 | Appropriately changed | 100 | 100 | Appropriately changed | 100 |
| Example 58 | 18.0 | 7.0 | 11.0 | Appropriately changed | 100 | 100 | Appropriately changed | 100 |
| Example 59 | 18.0 | 9.0 | 9.0 | Appropriately changed | 100 | 100 | Appropriately changed | 100 |
| Example 60 | 18.0 | 10.0 | 8.0 | Appropriately | 100 | 100 | Appropriately | 100 |

| | Arrangement of insulating layer | Positive active material | Negative active material | A | B | H (LogB-LogA) | I: Halfband width of pore peak diameter in insulating layer | Temporary deterioration ratio (relative to value 100 of Example 1) |
|---|---|---|---|---|---|---|---|---|
| Example 31 | On negative electrode | $LiNiMnCoO_2$ | HC | 0.9 | 3.0 | 0.5 | 0.5 | 104 |
| Example 32 | On negative electrode | $LiNiMnCoO_2$ | HC | 0.9 | 5.0 | 0.7 | 0.5 | 106 |
| Example 33 | On negative electrode | $LiNiMnCoO_2$ | HC | 0.9 | 8.0 | 0.9 | 0.6 | 114 |

TABLE 2-continued

| | | | | | | | | |
|---|---|---|---|---|---|---|---|---|
| Example 34 | On negative electrode | LiNiMnCoO$_2$ | HC | 0.9 | 9.0 | 1.0 | 0.7 | 116 |
| Comparative Example 7 | On negative electrode | LiNiMnCoO$_2$ | HC | 0.9 | 12.0 | 1.1 | 0.7 | 150 |
| Comparative Example 8 | On negative electrode | LiNiMnCoO$_2$ | HC | 0.9 | 14.0 | 1.2 | 0.8 | 160 |
| Example 35 | On negative electrode | LiNiMnCoO$_2$ | HC | 1.0 | 2.0 | 0.3 | 0.5 | 104 |
| Comparative Example 9 | On negative electrode | LiNiMnCoO$_2$ | HC | 1.0 | 0.1 | −1.0 | 0.3 | 172 |
| Example 36 | On negative electrode | LiNiMnCoO$_2$ | HC | 1.0 | 0.2 | −0.8 | 0.4 | 115 |
| Example 37 | On negative electrode | LiNiMnCoO$_2$ | HC | 1.0 | 0.3 | −0.5 | 0.4 | 112 |
| Example 38 | On negative electrode | LiNiMnCoO$_2$ | HC | 1.0 | 0.7 | −0.2 | 0.4 | 108 |
| Example 39 | On negative electrode | LiNiMnCoO$_2$ | HC | 1.0 | 1.0 | 0.0 | 0.4 | 105 |
| Example 40 | On negative electrode | LiNiMnCoO$_2$ | HC | 1.0 | 3.0 | 0.5 | 0.5 | 104 |
| Example 41 | On negative electrode | LiNiMnCoO$_2$ | HC | 1.0 | 5.0 | 0.7 | 0.5 | 108 |
| Example 42 | On negative electrode | LiNiMnCoO$_2$ | HC | 1.0 | 8.0 | 0.9 | 0.6 | 112 |
| Example 43 | On negative electrode | LiNiMnCoO$_2$ | HC | 1.0 | 9.0 | 1.0 | 0.7 | 115 |
| Comparative Example 10 | On negative electrode | LiNiMnCoO$_2$ | HC | 1.0 | 12.0 | 1.1 | 0.7 | 158 |
| Example 44 | On negative electrode | LiNiMnCoO$_2$ | HC | 1.0 | 2.0 | 0.3 | 0.5 | 104 |
| Comparative Example 11 | On negative electrode | LiNiMnCoO$_2$ | HC | 1.0 | 0.1 | −1.0 | 0.3 | 145 |
| Example 45 | On negative electrode | LiNiMnCoO$_2$ | HC | 1.0 | 0.2 | −0.8 | 0.4 | 118 |
| Example 46 | On negative electrode | LiNiMnCoO$_2$ | HC | 1.0 | 0.3 | −0.5 | 0.4 | 115 |
| Example 47 | On negative electrode | LiNiMnCoO$_2$ | HC | 1.0 | 0.7 | −0.2 | 0.4 | 108 |
| Example 48 | On negative electrode | LiNiMnCoO$_2$ | HC | 1.0 | 1.0 | 0.0 | 04 | 104 |
| Example 49 | On negative electrode | LiNiMnCoO$_2$ | HC | 1.0 | 3.0 | 0.5 | 0.5 | 103 |
| Example 50 | On negative electrode | LiNiMnCoO$_2$ | HC | 1.0 | 5.0 | 0.7 | 05 | 105 |
| Example 51 | On negative electrode | LiNiMnCoO$_2$ | HC | 1.0 | 8.0 | 0.9 | 06 | 109 |
| Example 52 | On negative electrode | LiNiMnCoO$_2$ | HC | 1.0 | 9.0 | 1.0 | 07 | 117 |
| Comparative Example 12 | On negative electrode | LiNiMnCoO$_2$ | HC | 1.0 | 12.0 | 1.1 | 07 | 140 |
| Example 53 | On negative electrode | LiNiMnCoO$_2$ | HC | 1.3 | 2.0 | 0.2 | 0.5 | 109 |
| Example 54 | On negative electrode | LiNiMnCoO$_2$ | Natural graphite | 1.3 | 2.0 | 0.2 | 0.5 | 115 |
| Comparative Example 13 | On negative electrode | LiNiMnCoO$_2$ | Natural graphite | 1.3 | 0.1 | −1.1 | 03 | 175 |
| Comparative Example 14 | On negative electrode | LiNiMnCoO$_2$ | Natural graphite | 1.3 | 0.2 | −0.9 | 0.4 | 168 |
| Example 55 | On negative electrode | LiNiMnCoO$_2$ | Natural graphite | 1.3 | 0.3 | −0.6 | 0.4 | 117 |
| Example 56 | On negative electrode | LiNiMnCoO$_2$ | Natural graphite | 1.3 | 0.7 | −0.3 | 0.4 | 108 |
| Example 57 | On negative electrode | LiNiMnCoO$_2$ | Natural graphite | 1.3 | 1.0 | −0.1 | 0.4 | 110 |
| Example 58 | On negative electrode | LiNiMnCoO$_2$ | Natural graphite | 1.3 | 3.0 | 0.4 | 05 | 113 |
| Example 59 | On negative electrode | LiNiMnCoO$_2$ | Natural graphite | 1.3 | 5.0 | 0.6 | 05 | 114 |
| Example 60 | On negative electrode | LiNiMnCoO$_2$ | Natural graphite | 1.3 | 8.0 | 0.8 | 0.6 | 120 |

TABLE 3

| | C (μm) | D (μm) | C-D (μm) | Porosity ratio of negative composite layer (relative to value 100 of Example 1) | Ratio of binder amount in insulating layer (relative to value 100 of Example 1) | E: Relative value of applied amount of positive composite layer | F: Relative value of applied amount of negative electrode | G: Relative value of thickness of insulating layer |
|---|---|---|---|---|---|---|---|---|
| Example 61 | 180 | 10.0 | 8.0 | Appropriately changed | 85 | 100 | Appropriately changed | 100 |
| Example 62 | 180 | 10.0 | 8.0 | Appropriately changed | 65 | 100 | Appropriately changed | 100 |
| Comparative Example 15 | 180 | 14.0 | 4.0 | Appropriately changed | 65 | 100 | Appropriately changed | 100 |
| Example 63 | 7.0 | 5.0 | 2.0 | 100 | 100 | 100 | 100 | 200 |
| Example 64 | 7.0 | 5.0 | 2.0 | 100 | 100 | 100 | 100 | 65 |
| Example 65 | 7.0 | 5.0 | 2.0 | 100 | 100 | Appropriately changed | 100 | 100 |
| Comparative Example 16 | 7.0 | 0.5 | 6.5 | 100 | 100 | Appropriately changed | 100 | 100 |
| Example 66 | 7.0 | 0.5 | 6.5 | 100 | 100 | Appropriately changed | 100 | 100 |
| Example 67 | 7.0 | 1.0 | 6.0 | 100 | 100 | Appropriately changed | 100 | 100 |
| Example 68 | 7.0 | 4.0 | 3.0 | 100 | 100 | Appropriately changed | 100 | 100 |
| Example 69 | 7.0 | 5.0 | 2.0 | 100 | 100 | Appropriately changed | 100 | 100 |
| Example 70 | 7.0 | 7.0 | 0.0 | 100 | 100 | Appropriately changed | 100 | 100 |
| Example 71 | 7.0 | 9.0 | -2.0 | 100 | 100 | Appropriately changed | 100 | 100 |
| Example 72 | 7.0 | 10.0 | -3.0 | 100 | 100 | Appropriately changed | 100 | 100 |
| Example 73 | 7.0 | 10.0 | -3.0 | 100 | 85 | Appropriately changed | 100 | 100 |
| Comparative Example 17 | 7.0 | 10.0 | -3.0 | 100 | 65 | Appropriately changed | 100 | 100 |
| Example 74 | 7.0 | 5.0 | 2.0 | 100 | 100 | 100 | 100 | 100 |
| Comparative Example 18 | 7.0 | 0.5 | 6.5 | 100 | 100 | 100 | 100 | 100 |
| Example 75 | 7.0 | 0.5 | 6.5 | 100 | 100 | 100 | 100 | 100 |
| Example 76 | 7.0 | 1.0 | 6.0 | 100 | 100 | 100 | 100 | 100 |
| Example 77 | 7.0 | 4.0 | 3.0 | 100 | 100 | 100 | 100 | 100 |
| Example 78 | 7.0 | 5.0 | 2.0 | 100 | 100 | 100 | 100 | 100 |
| Example 79 | 7.0 | 7.0 | 0.0 | 100 | 100 | 100 | 100 | 100 |
| Example 80 | 7.0 | 9.0 | -2.0 | 100 | 100 | 100 | 100 | 100 |
| Example 81 | 7.0 | 10.0 | -3.0 | 100 | 100 | 100 | 100 | 100 |
| Example 82 | 7.0 | 10.0 | -3.0 | 100 | 85 | 100 | 100 | 100 |
| Comparative Example 19 | 7.0 | 10.0 | -3.0 | 100 | 65 | 100 | 100 | 100 |
| Example 83 | 7.0 | 6.0 | 1.0 | 100 | 100 | 100 | 100 | 100 |
| Example 84 | 7.0 | 8.0 | -1.0 | 100 | 100 | 100 | 100 | 100 |
| Example 85 | 7.0 | 10.0 | -3.0 | 100 | 100 | 100 | 100 | 100 |

| | Arrangement of insulating layer | Positive active material | Negative active material | A | B | H (LogB-LogA) | I: Halfband width of pore peak diameter in insulating layer | Temporary deterioration ratio (relative to value 100 of Example 1) |
|---|---|---|---|---|---|---|---|---|
| Example 61 | On negative electrode | LiNiMnCoO$_2$ | Natural graphite | 1.3 | 9.0 | 0.8 | 0.7 | 124 |
| Example 62 | On negative electrode | LiNiMnCoO$_2$ | Natural graphite | 1.3 | 12.0 | 1.0 | 0.7 | 127 |
| Comparative Example 15 | On negative electrode | LiNiMnCoO$_2$ | Natural graphite | 1.3 | 15.0 | 1.1 | 0.8 | 158 |
| Example 63 | On negative electrode | LiNiMnCoO$_2$ | HC | 1.0 | 2.0 | 0.3 | 0.5 | 104 |
| Example 64 | On negative electrode | LiNiMnCoO$_2$ | HC | 1.0 | 2.0 | 0.3 | 0.5 | 97 |
| Example 65 | On negative electrode | LiFePO$_4$ | HC | 1.0 | 2.0 | 0.3 | 0.5 | 109 |
| Comparative Example 16 | On negative electrode | LiFePO$_4$ | HC | 1.0 | 0.1 | -1.0 | 0.3 | 187 |
| Example 66 | On negative electrode | LiFePO$_4$ | HC | 1.0 | 0.2 | -0.8 | 0.4 | 128 |
| Example 67 | On negative electrode | LiFePO$_4$ | HC | 1.0 | 0.3 | -0.5 | 0.4 | 123 |

TABLE 3-continued

| | | | | | | | | |
|---|---|---|---|---|---|---|---|---|
| Example 68 | On negative electrode | LiFePO$_4$ | HC | 1.0 | 0.7 | −0.2 | 0.4 | 117 |
| Example 69 | On negative electrode | LiFePO$_4$ | HC | 1.0 | 1.0 | 0.0 | 0.4 | 111 |
| Example 70 | On negative electrode | LiFePO$_4$ | HC | 1.0 | 3.0 | 0.5 | 0.5 | 108 |
| Example 71 | On negative electrode | LiFePO$_4$ | HC | 1.0 | 5.0 | 0.7 | 0.5 | 110 |
| Example 72 | On negative electrode | LiFePO$_4$ | HC | 1.0 | 8.0 | 0.9 | 0.6 | 117 |
| Example 73 | On negative electrode | LiFePO$_4$ | HC | 1.0 | 9.0 | 1.0 | 0.7 | 120 |
| Comparative Example 17 | On negative electrode | LiFePO$_4$ | HC | 1.0 | 12.0 | 1.1 | 0.7 | 179 |
| Example 74 | On separator | LiNiMnCoO$_2$ | HC | 1.0 | 2.0 | 0.3 | 0.5 | 98 |
| Comparative Example 18 | On separator | LiNiMnCoO$_2$ | HC | 1.0 | 0.1 | −1.0 | 0.3 | 151 |
| Example 75 | On separator | LiNiMnCoO$_2$ | HC | 1.0 | 0.2 | −0.8 | 0.4 | 119 |
| Example 76 | On separator | LiNiMnCoO$_2$ | HC | 1.0 | 0.3 | −0.5 | 0.4 | 108 |
| Example 77 | On separator | LiNiMnCoO$_2$ | HC | 1.0 | 0.7 | −0.2 | 0.4 | 97 |
| Example 78 | On separator | LiNiMnCoO$_2$ | HC | 1.0 | 1.0 | 0.0 | 0.4 | 100 |
| Example 79 | On separator | LiNiMnCoO$_2$ | HC | 1.0 | 3.0 | 0.5 | 0.5 | 104 |
| Example 80 | On separator | LiNiMnCoO$_2$ | HC | 1.0 | 5.0 | 0.7 | 0.5 | 107 |
| Example 81 | On separator | LiNiMnCoO$_2$ | HC | 1.0 | 8.0 | 0.9 | 0.6 | 115 |
| Example 82 | On separator | LiNiMnCoO$_2$ | HC | 1.0 | 9.0 | 1.0 | 0.7 | 116 |
| Comparative Example 19 | On separator | LiNiMnCoO$_2$ | HC | 1.0 | 12.0 | 1.1 | 0.7 | 148 |
| Example 83 | On negative electrode | LiNiMnCoO$_2$ | HC | 1.0 | 2.0 | 0.3 | 0.6 | 104 |
| Example 84 | On negative electrode | LiNiMnCoO$_2$ | HC | 1.0 | 2.0 | 0.3 | 0.7 | 107 |
| Example 85 | On negative electrode | LiNiMnCoO$_2$ | HC | 1.0 | 2.0 | 0.3 | 0.8 | 119 |

Figure 8:
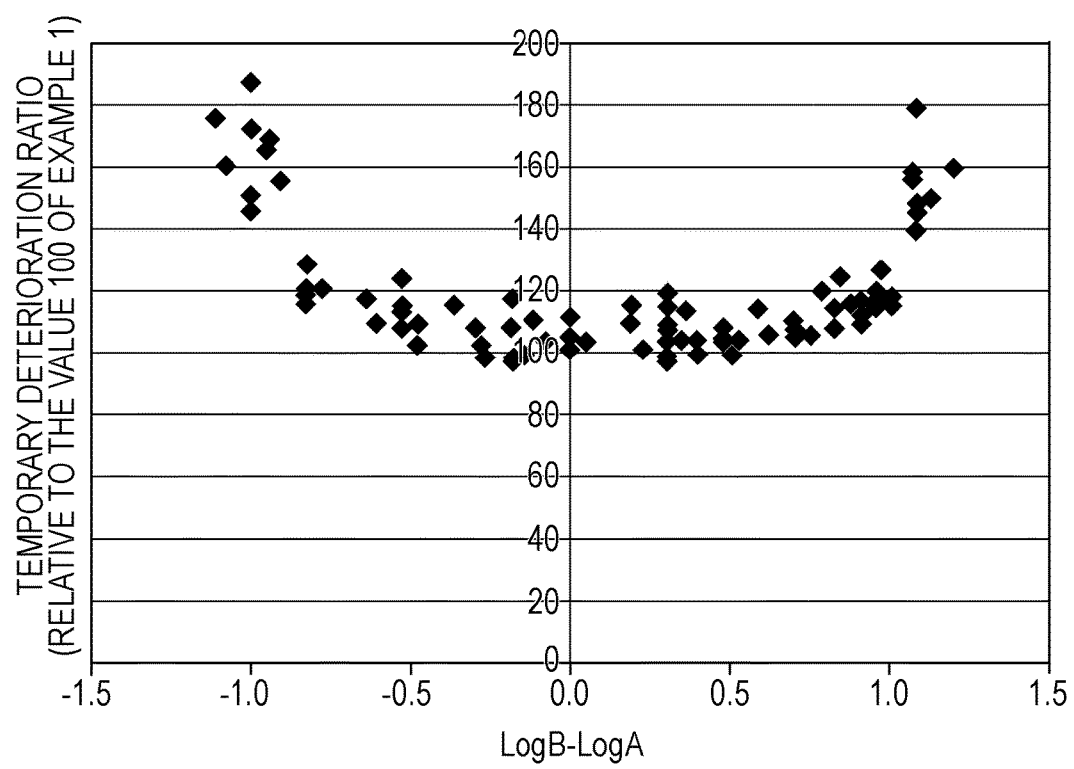
FIG. 8 is a graph showing results of the temporary deterioration ratio of batteries.

The results of the temporary deterioration ratio of the examples and the comparative examples are shown as a graph in FIG. 8. In FIG. 8, the transverse axis represents the value of "Log B−Log A", and the vertical axis represents a temporary deterioration ratio. As is understood from FIG. 8, about the batteries of examples, in which −0.8≤Log B−Log A≤1.0 was satisfied, the temporary deterioration ratio was suppressed.

The reason why temporary deterioration is suppressed when the relational expression (1) is satisfied by the pore peak diameter A in the pore distribution of a composite layer of the negative electrode and the pore peak diameter B in the pore distribution of the insulating layer is not completely clarified. However, a reason would be assumed that the ion conductivity of the insulating layer is made even in the plane direction thereof, whereby the ununiformed reaction thereof in the electrode plane direction can be suppressed, and, as a result, temporary deterioration of the battery can be suppressed.

What is claimed is:

1. An energy storage device, comprising:
a positive electrode;
a negative electrode; and
an insulating layer arranged between the positive and negative electrodes to electrically insulate the positive and negative electrodes,
wherein the negative electrode includes a composite layer containing active material particles,
the composite layer of the negative electrode, and the positive electrode are arranged to face each other across the insulating layer,
the insulating layer contains electrically insulating particles, and is made porous by a gap between the electrically insulating particles,
the composite layer of the negative electrode is made porous by a gap between the active material particles, and the following relational expression (1) is satisfied:

$$-0.8 \leq \text{Log } B - \text{Log } A \leq 1.0$$

in which in a distribution of pores in the composite layer, a pore peak diameter is represented by A (μm), and in a distribution of pores in the insulating layer, a pore peak diameter is represented by B (μm), and
the pore peak diameter of the composite layer is 0.5 μm or more and 1.5 μm or less.

2. The energy storage device according to claim 1, wherein the pore peak diameter of the composite layer and the pore peak diameter of the insulating layer satisfy −0.6≤Log B−Log A.

3. The energy storage device according to claim 1, wherein the pore peak diameter of the composite layer and the pore peak diameter of the insulating layer satisfy −0.3≤Log B−Log A.

4. The energy storage device according to claim 1, wherein the pore peak diameter of the composite layer and the pore peak diameter of the insulating layer satisfy Log B−Log A<0.9.

5. The energy storage device according to claim 1, wherein the pore peak diameter of the composite layer and the pore peak diameter of the insulating layer satisfy Log B−Log A<0.5.

6. The energy storage device according to claim 1, wherein an average primary particle diameter D90 of the active material particles in the composite layer is 3 μm or more and 18 μm or less.

7. The energy storage device according to claim 1, wherein the following relational expression (2) is satisfied:

$$-3 \leq C - D \leq 6$$

in which an average primary particle diameter D90 of the active material particles in the composite layer is represented by C (μm), and an average primary particle diameter D90 of the electrically insulating particles in the insulating layer is represented by D (μm).

8. The energy storage device according to claim 7, wherein the average primary particle diameter D90 of the active material particles in the composite layer and the average primary particle diameter D90 of the electrically insulating particles in the insulating layer satisfy $0 \leq C-D \leq 3$.

9. The energy storage device according to claim 1, wherein the active material particles in the negative electrode comprise non-graphitizable carbon.

10. The energy storage device according to claim 1, wherein the composite layer of the negative electrode further comprises carboxymethylcellulose.

11. The energy storage device according to claim 1, wherein the pore peak diameter of the insulating layer is 0.2 μm or more and 12 μm or less.

12. The energy storage device according to claim 1, wherein the insulating layer is formed on the composite layer.

13. The energy storage device according to claim 1, wherein the energy storage device further includes a separator, and
the insulating layer is formed on the separator.

14. The energy storage device according to claim 1, wherein the pore peak diameter of the composite layer and the pore peak diameter of the insulating layer satisfy $-0.8 \leq \text{Log } B - \text{Log } A \leq 0.4$.

* * * * *